United States Patent [19]

Milov et al.

[11] 4,150,377
[45] Apr. 17, 1979

[54] RANGING SYSTEM FOR GUIDING MOVING OBJECTS OVER EQUIDISTANT TRACKS

[76] Inventors: Vladimir A. Milov, ulitsa Ignatova, 47, kv. 68; Igor I. Injutkin, ulitsa Nekrasova, 146, both of Krasnodar; Alexandr G. Polivoda, Elizavetinsky raion, stanitsa Elizavetinskaya, ulitsa Zelenaya, 22a, Krasnodarsky krai; Gennady A. Ermakov, ulitsa Zipovskaya, 23, kv. 433, Krasnodar; Jury G. Negry, ulitsa Peschanaya, 11, kv. 83, Krasnodar; Valery V. Ponomarenko, ulitsa Vlasova, 76, kv. 1, Krasnodar; Evgeny I. Starchenko, ulitsa Blagoeva, 2, kv. 35, Krasnodar, all of U.S.S.R.

[21] Appl. No.: 783,026

[22] Filed: Mar. 30, 1977

[51] Int. Cl.² ............................................. G01S 9/04
[52] U.S. Cl. ............................... 343/12 R; 343/7 VM
[58] Field of Search ............. 343/12 R, 7 ED, 7 VM

[56] References Cited

U.S. PATENT DOCUMENTS

| | | | |
|---|---|---|---|
| 3,300,780 | 1/1967 | Mason | 343/12 R |
| 3,564,543 | 2/1971 | Nehama et al. | 343/5 LS |
| 3,900,259 | 8/1975 | Mott et al. | 343/12 R |

*Primary Examiner*—Maynard R. Wilbur
*Assistant Examiner*—Richard E. Berger
*Attorney, Agent, or Firm*—Lackenbach, Lilling & Siegel

[57] ABSTRACT

A ranging system for guiding moving objects over equidistant tracks comprises a ground station and airborne equipment. The ground station includes a receiver and a transmitter connected to each other and to an aerial. The airborne equipment includes a reference-frequency oscillator; a frequency divider for obtaining meander-shaped signals of the modulation frequency connected to the reference-frequency oscillator; a transmitter connected to the frequency divider an airborne aerial coupled to the transmitter; a receiver connected to the airborne aerial; a digital filter, for producing a reference pulse when the modulation frequency signal derived at the output of the receiver crosses zero, connected to the receiver and to the reference-frequency oscillator; a variable delay unit, to shift the reference pulse within the pulse period of the reference-frequency oscillator, connected to the digital filter; a processing unit, for statistical processing of reliable signals to produce an error signal proportional to the deviation of the moving object from a prescribed track, the polarity of the error signal defining the direction of said deviation, coupled to the variable delay unit and to the reference-frequency oscillator; a deviation indicator, for indicating the deviation of the moving object from a prescribed track, connected to the processing unit; a control unit, to control the magnitude of the shift of the reference pulse in the variable delay unit for indicating prescribed equidistant tracks by zero reading of the deviation indicator, coupled to the processing unit, having two command inputs for manual input of commands, and connected to the variable delay unit.

10 Claims, 17 Drawing Figures

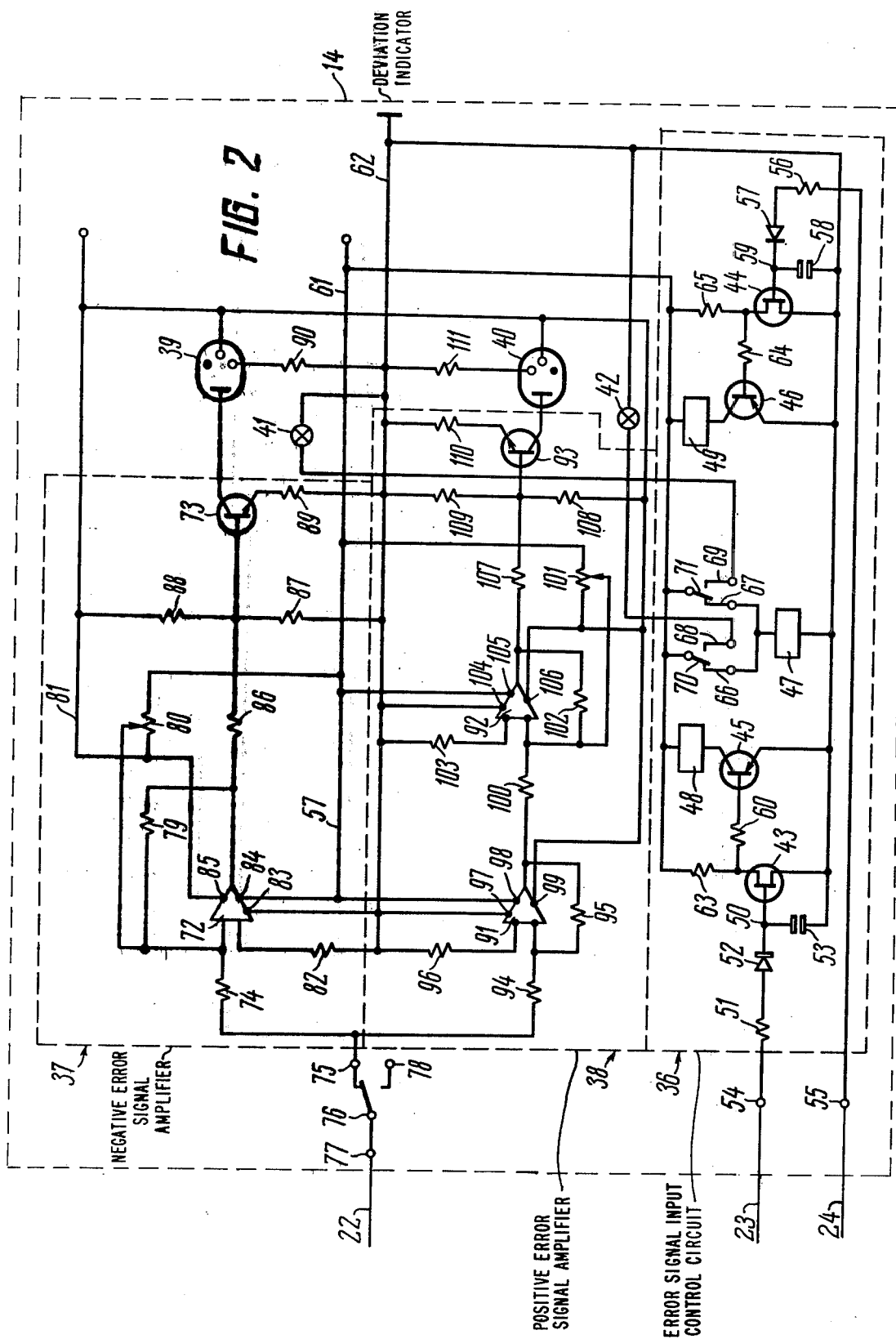

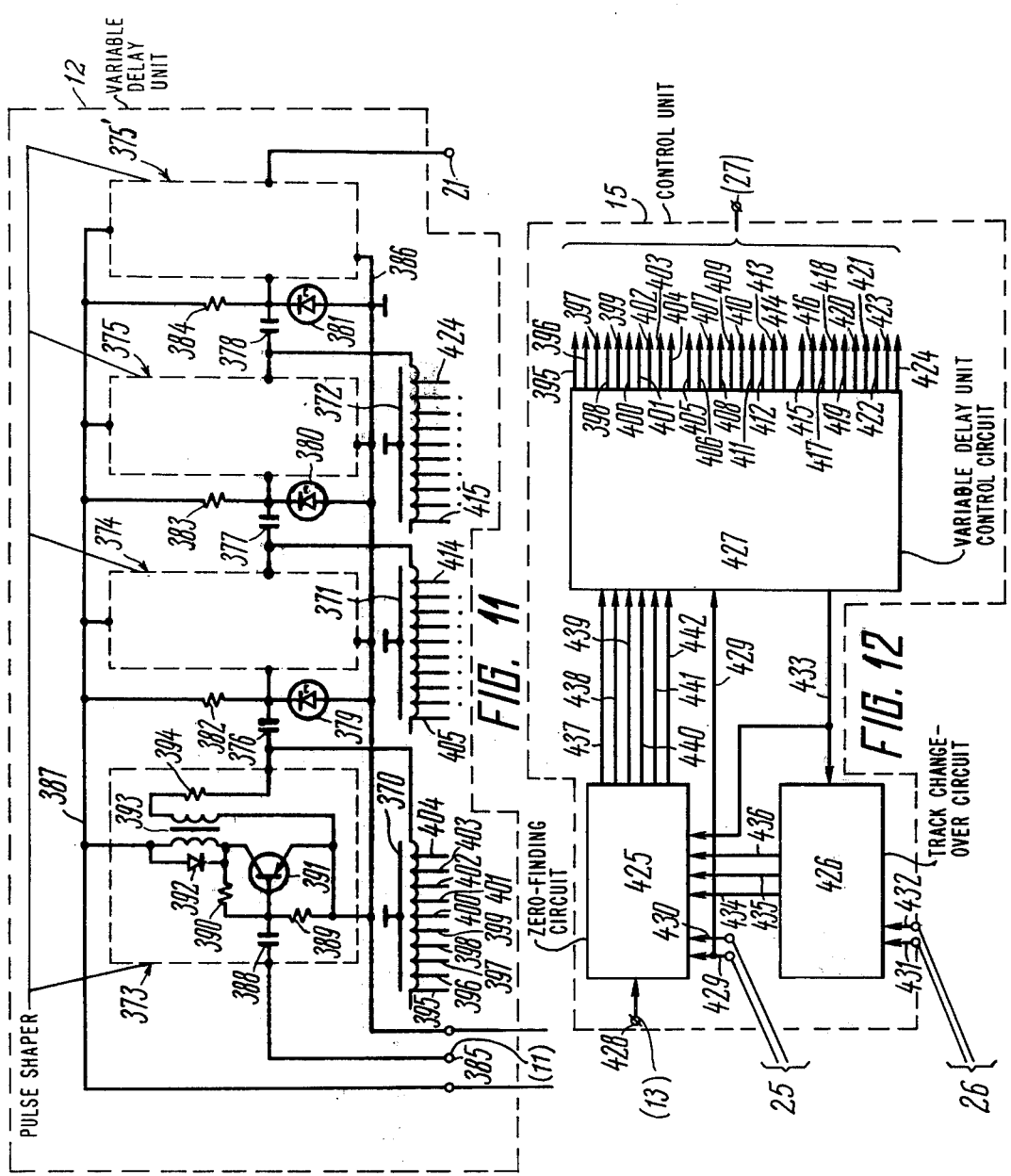

RANGING SYSTEM FOR GUIDING MOVING OBJECTS OVER EQUIDISTANT TRACKS

FIELD OF THE INVENTION

The present invention relates to radio navigation systems and more particularly to ranging systems for guiding moving objects over equidistant tracks.

The invention can be used for guiding moving objects while tracking them over predetermined tracks and, particularly, for guiding aircraft in agricultural applications. The invention can also be used for automatic tracking of dredgers, tractors and other moving objects when a high directional accuracy is required.

DESCRIPTION OF THE PRIOR ART

The prior art ranging system, which ensures aircraft flight over a predetermined flight track, meets the requirements of flight tracking in chemical agricultural applications, both over small and large areas and is suitable for most types of short-range aircraft.

The system comprises two portable ground transmitting stations—Master and Slave stations. Both stations produce a hyperbolic pattern of half-phase lines over a spray area, the distance therebetween depending on the actual frequency range used. The aircraft is fitted with an aerial and a receiver, which is coupled to the flying-instrument display arranged in front of the pilot. The aircraft receiver is a phase-measuring device which determines the aircraft position in relation to the pattern of half-phase lines. The system can be used by the pilot to maintain the aircraft on the predetermined flight track, following hyperbolic half-phase lines, the direction depending on the position of the ground stations. The track following display instrumentation fitted in the cockpit consists of a circular light decometer and tracking lights, the latter fitted in the coaming, which acts as a left/right deviation indicator.

It was found possible to track the flight on either side of the center with an allowable tracking error of $\mp 1.75$ m on the baseline. As the accuracy decreases away from the baseline, tracking is possible within only one light signal on either side of center.

However, the above-mentioned system fails to provide unambiguous readings. This defect may be overcome by using an additional device. Pulsed and continuous noise at the carrier frequency leads to the loss of information about the moving object's position in space.

Since a carrier frequency is used in the system for range finding, the resolution of the system varies from 1.5 to 1.9 m, depending upon the carrier frequency value, and, consequently, the upper limit of distance setting between equidistant tracks is changed from 75 to 95 m. As a result, the pilot has to make the necessary calculations with the use of tables before the take-off.

A ranging system is known, in which phase-difference measurement at a modulation frequency is used for guiding objects over equidistant tracks, which comprises a ground station and airborne equipment. The ground station includes a receiver, a transmitter with an input connected to an output of the receiver, and a transceiving aerial connected to an input of the receiver and an output of the transmitter. The airborne equipment includes a reference-frequency oscillator, a transmitter, a receiver, a track deviation indicator and an airborne aerial. The output of the reference frequency oscillator is connected to the input of the airborne transmitter, and the output of said transmitter and the input of the airborne receiver are coupled to the airborne aerial. The output of the airborne receiver is connected to the output of the track deviation indicator.

The operation of this prior art system is based on phase methods of range finding employing a modulation frequency. The reference frequency oscillator generates a modulation frequency signal to modulate high frequency natural oscillations of the airborne transmitter. The modulated high frequency oscillations radiated by the airborne aerial are received by the transceiving aerial connected to the input of the ground station receiver. The ground station receiver recovers the modulation frequency signal used to modulate high frequency natural oscillations of the ground station transmitter, the frequency of said oscillations being different from that of the high frequency oscillations of the airborne transmitter.

Modulated high frequency oscillations of the ground station transmitter radiated by the transceiving aerial are then received by the airborne aerial and applied to the input of the airborne receiver to recover the modulation frequency signal. The phase shift of the modulation frequency signal at the output of the airborne receiver with respect to the reference-frequency oscillator signal is proportional to the distance between the ground station and the moving object.

In this way, circular curves of equal phase, refered to as isophases, are produced over the parcel being treated.

When the ground transmitting station is at a reasonable distance from the parcel, said isophases may be approximated by straight lines. The moving object track deviation indicator converts the phase shift value into a control signal proportional to the magnitude of deviation of the moving object from the isophase line taken as the flight track. For ease of readout, the deviation indicator is calibrated in distance increment values.

The pilot picks out the flight course of the first track according to the landmarks or the conventional navigation instrument indications and, on approaching the parcel, brings the system into operation. During the flight over the track the system measures the distance and compares it with the initial value, thus providing the pilot with data on the moving object track deviation.

The moving object track deviation indicator incorporates director means which are visual instruments of the director system intended to produce an information simulator of manned flight and to ensure the required accuracy of tracking and flight over a selected course, considering the limited time available for the pilot.

However, these prior art systems fail to provide the required accuracy of measuring the range and, consequently, the distance increment when deviation of the moving object from the track occurs. Though some attemps have been recently made to increase the accuracy by the statistical processing of data fed to the indicator means, they fail to provide the required accuracy because of the fact that the time interval necessary for data presentation from the statisitcal processing networks considerably exceeds the allowable data presentation time for high-speed moving objects.

Besides, the time required for the pilot to perceive the data of the director means used in said systems indicators exceeds the maximum allowable navigation safety time under severe time-shortage conditions, i.e. when flying at typical delivery heights in agricultural applications (i.e. from 5 to 50 m).

SUMMARY OF THE INVENTION

It is an object of the present invention to provide a ranging system for guiding moving objects over equidistant tracks, which ensures a higher accuracy of measuring track deviations.

Another object of the present invention is to provide a ranging system for guiding moving objects over equidistant tracks which ensures higher noise immunity, especially in lively broadcasting areas.

Still another object of the present invention is to provide a ranging system for guiding moving objects over equidistant tracks, which ensures a simplified information simulator of manned flight.

Yet another object of the present invention is to provide a ranging system for guiding moving objects over equidistant tracks, which accelerates the pilot's perception of the data on the moving object position and its deviation relative to the selected track.

With these and other objects in view, there is proposed a ranging system for guiding moving objects over equidistant tracks, which comprises a ground station and airborne equipment. The ground state incorporates a receiver, a transmitter with an input connected to the output of said receiver, and a transceiving aerial connected to the input of said receiver and the output of said transmitter. The airborne equipment incorporates a reference-frequency oscillator, a transmitter, a receiver, a transceiving aerial connected to the output of said transmitter of the airborne equipment and the input of said receiver of the airborne equipment, a deviation indicator for indicating the deviation of the moving object from the prescribed track, a frequency divider to provide meander-shaped signals of modulation frequency, a digital filter for producing a reference pulse when the modulation frequency signal derived from an output of the airborne receiver passes through zero, a variable delay unit to shift the reference pulse within the pulse period of the reference-frequency, a processing unit for statistical processing of reliable signals to produce an error signal proportional to the deviation of the moving object from the prescribed track, the polarity of the error signal defining the direction of said deviation, and a control unit to control the magnitude of the reference pulse shift in said variable delay unit for indicating prescribed equidistant tracks by zero reading of the track deviation indicator. The input of the frequency divider is connected to the output of the reference-frequency oscillator, the output of the frequency divider is connected to the input of the airborne transmitter, the first input of the digital filter is connected to the output of the airborne receiver, the second input of the digital filter is connected to the output of the reference-frequency oscillator, the first input of the variable delay unit is connected to the output of the digital filter, first and second inputs of the processing unit are connected to the output of the variable delay unit and to the output of the reference-frequency oscillator, respectively, an error signal output and first and second command outputs of the processing unit are connected, respectively, to a control input and to first and second command inputs of the deviation indicator, the input of the control unit is connected to the error signal output of the processing unit, first and second command inputs of the control unit are used for manual input of commands, and the output of the control unit is connected to the second input of the variable delay unit.

The advantage of this system is that the frequency divider, the variable delay unit and the unit for statistical processing of reliable signal make it possible to statistically process not the absolute aircraft-to-ground station range data, but the relative distance increments of the moving object track deviation, which increases the accuracy of measuring track deviations and the allowable data presentation time for high-speed moving objects. The control unit incorporated into the proposed circuit provides a simpler information simulator of a manned flight, because the pilot is free from performing logic operation of calculation and interpolation, his functions being reduced to simple operations i.e. input of the commands by pressing corresponding buttons. What is more, the system features an increased noise immunity due to the narrow passband of the digital filter with its aperiodic transient response.

In accordance with one embodiment of the present invention, the processing unit incorporates a main gating pulse shaper, a dependent gating pulse shaper tripped by the trailing edge of the main gating pulse, two coincidence circuits for obtaining pulses, the pulse width being proportional to the time overlap of the reference-frequency osicllator pulses and the main and dependent gating pulses, and a differential averaging unit for obtaining an error signal whose value is proportional to the width difference of the pulses of said coincidence circuits. The input of the main gating pulse shaper is connected to the first input of the processing unit, the input of the dependent gating pulse shaper is connected to the first output of the main gating pulse shaper, the first inputs of the coincidence circuits are connected to the second output of the main gating pulse shaper and to the output of the dependent gating pulse shaper, respectively, the second inputs of the coincidence circuit are connected to the second input of the processing, each of the two inputs of the differential averaging unit is coupled to the output of a respective coincidence circuit, and the output of the differential averaging unit is connected to the error signal output of the processing unit.

Such a circuit arrangement used for processing reliable signals eliminates the processing of impulse noise and overshoots caused by random fluctuation processes and lying outside the limits of the time interval defined by the width of the main and dependent gating pulses. Noise immunity of the system is appreciably increased due to the small probability of noise appearing within the time period allowed by the gating pulses, being equal to the ratio of twice the width of the gating pulses to the pulse period of said gating pulses.

It is advisable that the deviation indicator, for indicating the deviation of the moving object from a prescribed track, should comprise two warning light indicators for indicating the moving object position relative to the selected track, and two linear indicators for evaluating the magnitude of the moving object deviation from the track, each of the warning light indicators being operatively associated with one of the command inputs of the deviation indicator, said linear indicators being aligned with their glow start points adjacent and being operatively associated with the control input of the deviation indicator.

An appropriate arrangement of the indicators as well as its luminous intensity provides for a considerable decrease in the pilot's time of preception of the data on the aircraft position with respect to the selected track and on its relative track deviation when the pilot's attention is diverted to, for instance, the landmarks. The data on the aircraft position is then perceived by the pilot's peripheral vision, resulting in an open space illustion (e.g. if there are no inhibiting lights, the way is free).

The control unit can comprise a zero-finding circuit for indicating an initial equidistant track on the deviation indicator, a track changeover circuit for indicating subsequent equidistant tracks on the deviation indicator and a variable delay unit control circuit for setting the value of reference pulse delay in the variable delay unit. The first input of the zero-finding circuit is the input of the control unit, and the second input of the zero-finding circuit constitutes the first command input of the control unit. Two clock pulse inputs of the zero-finding circuit are operatively associated with two of its clock pulse outputs, respectively. The zero-finding circuit incorporates an operational amplifier responsive to passage of an error signal through zero, and ensuring an operative coupling of the third clock pulse input of the zero-finding circuit with one clock pulse output of the zero-finding circuit within the interval between the input of command transfer to the other input of the zero finding circuit and the first passage through zero of the error signal, as well as an operative coupling with the other clock pulse output of the zero-finding circuit within the interval between the first and second passages through zero of the error signal. Two switches to reverse the direction of the reference pulse shift in the variable delay unit are included, the change-over contacts of said switches being mechanically interconnected, while each of the two contacts of either switch is operatively associated with one output of one of the two pairs of reversal signal outputs of the zero-findng circuit. The first input of the track change-over circuit constitutes the second command input of the control unit. Three outputs of the track change-over circuit are connected, respectively, to three clock pulse inputs of the zero-finding circuit. The track change-over circuit incorporates a clock, its output being operatively associated with two outputs of the track changeover circuit and constituting the third output of the track change-over circuit; a register with its input operatively associated with the output of the clock; and two track-to-track distance switches for counting clock pulses from two outputs of the track change-over circuit. Each of the contacts of either track-to-track distance switch is connected to the output of the corresponding register bit location, the change-over contacts of the track-to-track distance switches being operatively associated with the outputs of the track change-over circuit, respectively. One input of the variable delay unit control circuit is connected to one of the command inputs of the control unit. Two pairs of reversal signal inputs of the variable delay unit control circuit one connected, respectively, to two pairs of reversal signal outputs of the zero-finding circuit. Two clock pulse inputs of the variable delay unit control circuit are connected, respectively, to two clock pulse outputs of the zero-finding circuit. The output of the variable delay unit control circuit is connected to the third input of the zero-finding circuit and to the other input of the track change-over circuit. A set of outputs of the variable delay unit control circuit constitutes the output of the control unit. The variable delay unit control circuit incorporates three reversible shift registers, the reset inputs thereof being connected to one input of the variable delay unit control circuit, a complementing input of one reversible register being connected to one of the clock pulse inputs of the variable delay unit control circuit, a complementing input of another reversible register being operatively associated with the outputs of the first and the last bit locations of the first register, a complementing input of a third reversible register being connected to another clock pulse input of the variable delay unit control circuit. Forward shift command inputs and backward shift command inputs of two reversible registers are connected, respectively, to two inputs of one pair of reversal signal inputs of the variable delay unit control circuit. A backward shift command imput and a forward shift command input of the third reversible register are connected, respectively, to two inputs of another pair of reversal signal inputs of the variable delay unit control circuit. The outputs of each bit of all the reversible registers are operatively associated with one of the outputs of the set of outputs of the variable delay unit control circuit. The output of the first and the last bit locations of the third reversible register are operatively associated with the output of the variable delay unit control circuit.

The transmitter of the ground station and that of the airborne equipment can comprise a modulator incorporating a transistor, with a field-effect transistor and a capacitor connected in series in the feedback loop.

Such a circuit arrangement ensures a linear variation of the a.c. modulation factor according to the modulation frequency signal law.

The differential averaging unit can comprise two input integrating circuits, to average pulses fed from the outputs of the coincidence circuits, and an operational amplifier. the input integrating circuits each incorporates a series network comprising a first resistor, a diode and a capacitor, and a second resistor inserted between the junction point of said diode and said capacitor and one of the inputs of the operational amplifier.

Such a circuit arrangement provides a simplified design of the processing unit for statistical processing of reliable signals due to the timing separation of three main operations of the statistical signal processing (converting, adding and averaging, accomplished) by the same unit.

BRIEF DESCRIPTION OF THE DRAWINGS

Other objects and advantages of the present invention will become clear after a study of the following detailed description of an embodiment thereof in conjunction with the accompanying drawings, wherein:

FIG. 2 is an electrical schematic diagram of the deviation indicator for indicating the deviation of the moving object from a prescribed track, according to the invention;

FIG. 11 is an electrical schematic diagram of the variable delay unit, according to the invention;

FIG. 12 is a block diagram of the control unit, according to the invention;

DETAILED DESCRIPTION OF THE INVENTION

Figure 1:
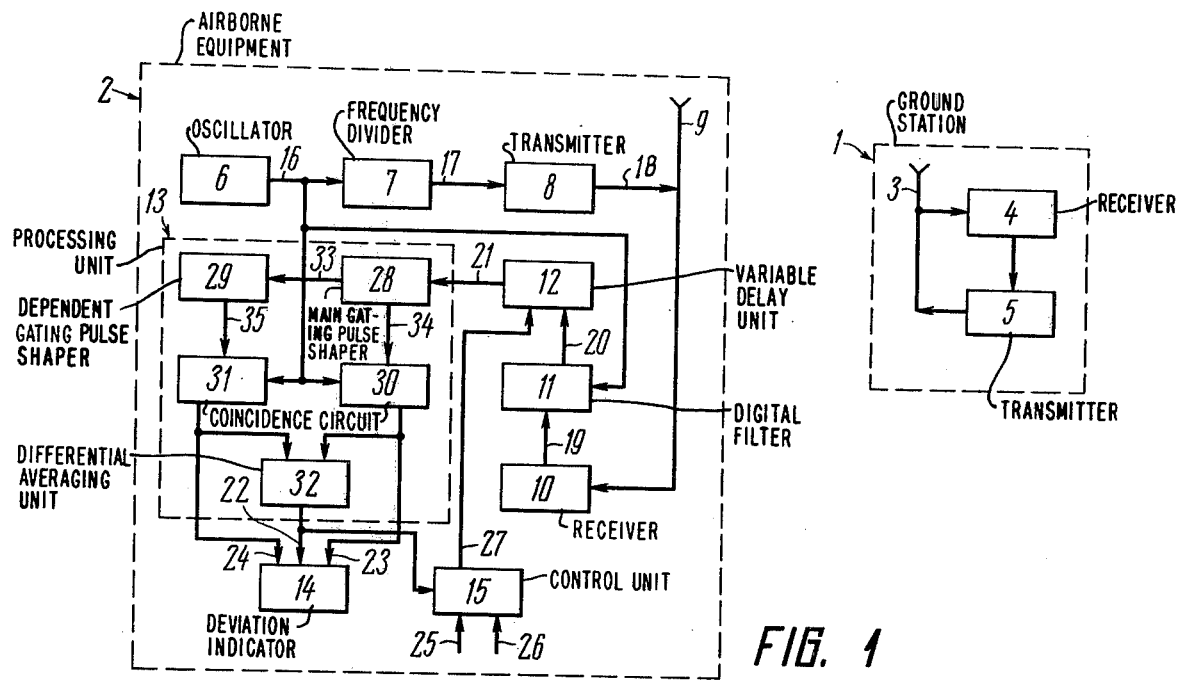
FIG. 1 is a block diagram of a ranging system for guiding moving objects over equidistant tracks, according to the invention.

The proposed ranging system for guiding moving objects over equidistant tracks will be described hereinbelow as a system adapted for aerial agricultural application work.

The ranging system, according to the invention, comprises a ground station 1 (FIG. 1) located near the field being sprayed (not shown) and airborne equipment 2 installed in the aircraft (not shown).

The ground station 1 includes a transceiving aerial 3, a receiver 4 and a transmitter 5, the input of the receiver 4 and the output of the transmitter 5 being connected to the transceiving aerial 3 and the output of the receiver 4 being connected to the input of the transmitter 5.

The airborne equipment 2 comprises a reference-frequency oscillator 6, a frequency divider 7 for obtaining meander-shaped signals of modulation frequency (a meander-shaped signal being a square-wave signal whose pulse duration is equal to half the period), a transmitter 8, an airborne aerial 9, a receiver 10, a digital filter 11 for producing a reference pulse when the modulation frequency signal derived from the output of the receiver passes through zero, a variable delay unit 12 to shift a reference pulse within the pulse period of the reference-frequency oscillator 6, a processing unit 13 for statistical processing of reliable signals to produce an error signal proportional to the deviation of the moving object from a prescribed track the polarity of the error signal defining the direction of said deviation, a deviation indicator 14 for indicating the deviation of the moving object from a prescribed track, and a control unit 15 controlling the magnitude of the reference pulse shift in the variable delay unit 12 for indicating prescribed equidistant tracks by zero reading of the deviation indicator 14.

An output 16 of the reference-frequency oscillator 6 is connected to the input of the frequency divider 7. An output 17 of the frequency divider 7 is connected to the input of the transmitter 8, and an output 18 of said transmitter 8 is coupled to the airborne aerial 9. The input of the receiver 10 is also connected to the airborne aerial 9 and an output 19 of said receiver 10 is connected to a first input of the digital filter 11. The second input of the digital filter 11 is coupled to the output 6 of the reference-frequency oscillator 6 and an output 20 of said digital filter 11 is connected to the first input of the variable delay unit 12. An output 21 of the variable delay unit 12 is coupled to a first input of the processing unit 13 and a second input of the processing unit 13 is connected to the output 16 of the reference-frequency oscillator 6. The processing unit 13 has an error signal output 22 and first and second command outputs 23 and 24. The error signal output 22 of the unit 13 is connected with the control input of the deviation indicator 14 and with a first input of the control unit 15. The command outputs 23 and 24 of the processing unit 13 are coupled, respectively, to the command inputs of the deviation indicator 14. The command inputs 25, 26 of the control unit 15 are used for manual input of the commands "SEARCH" and "TRANSFER" by pressing corresponding buttons arranged, for example, on the control panel (not shown) in the aircraft cockpit (not shown). An output 27 of the control unit 15 is connected to the second input of the variable delay unit 12.

The processing unit 13 incorporates a main gating pulse shaper 28 for producing a main gating pulse from the pulse of the variable delay unit 12, a dependent gating pulse shaper 29 for producing a dependent gating pulse defined by the main gating pulse trailing edge, two coincidence circuits 30 and 31 for obtaining pulses, the width of these pulses being proportional to the time overlap of the pulses of the reference-frequency oscillator 6 and the main and dependent gating pulses, and a differential averaging unit 32 for obtaining an error signal, its value being proportional to the width difference of the pulses of the coincidence circuits 30 and 31.

The first input of the processing unit 13 is connected to an input of the main gating pulse shaper 28, a first output 33 of the shaper 28 is connected to an input of the dependent gating pulse shaper 29, and a second output 34 of the shaper 28 is connected to a first input of the coincidence circuit 30. An output 35 of the dependent gating pulse shaper 29 is coupled to a first input of the coincidence circuit 31. The second inputs of the coincidence circuits 30 and 31 are interconnected and coupled to the second input of the processing unit 13. The outputs of the coincidence circuits 30 and 31 are connected to the command outputs 23 and 24 of the processing unit 13, respectively.

A first input of the differential averaging unit 32 is connected to the output of the coincidence circuit 30, a second input of the differential averaging unit 32 is connected to the output of the coincidence circuit 31, and an output of the differential averaging unit 32 is connected to the error signal output 22 of the processing unit 13.

FIG. 2 is a circuit diagram of the deviation indicator. The deviation indicator 14 for indicating the deviation of the moving object from a prescribed track comprises an error signal input control circuit 36, a negative error signal amplifier 37, a positive error signal amplifier 38, two linear gas-discharge indicators (a right-hand one 39 and a left-hand one 40) for indicating the magnitude of the moving object track deviation, and two warming indicators (a right indicator light 41 and a left indicator light 42) for indicating the moving object position relative to a prescribed track.

As it will be shown below, the linear indicators 39 and 40 are coupled via amplifiers 37 and 38, respectively to the control input of the deviation indicator 14 and each of the indicator lights 41 and 42 is connected via the error signal input control circuit 36 to one of the command inputs of the deviation indicator 14.

The error signal input control circuit 36 incorporates field-effect transistors 43 and 44, transistors 45 and 46 and relays 47, 48 and 49. The gate of the field-effect transistor 43 is connected at 50 to an integrating circuit including a resistor 51, a diode 52 and a capacitor 53. An input 54 of said integrating circuit is connected to one of the command inputs of the deviation indicator 14.

The other command input of the deviation indicator is coupled to an input 55 of a similar integrating circuit incorporating a resistor 56, a diode 57 and a capacitor 58, said integrating circuit being connected to the gate of the field-effect transistor 44 at 59.

Both the above mentioned integrating circuits have short charge time constants and long discharge time constants, defined by the input resistances of the field-effect transistors 43 and 44. The drain of the field-effect transistor 43 is connected via a resistor 60 to the base of the transistor 45 and via a resistor 63 to a bus 61, negatively biased relative to a zero bus 62 by a d.c. voltage applied thereto. The source of the field-effect transistor 43 is connected to the zero bus 62. The drain of the field-effect transistor 44 is coupled to the base of the transistor 46 via a resistor 64 and to the bus 61 via a resistor 65. The source of the field-effect transistor 44 is connected to the zero bus 62. The relay 48 is connected into the collector circuit of the transistor 45, and the relay 49 is connected into the collector circuit of the transistor 46. A normally closed contact 66 of the relay 48 and a normally closed contact 67 of the relay 49 are connected to the winding of the relay 47. A normally open contact 68 of the relay 48 is connected to one of the terminals of the left indicator light 42. A normally open contact 69 of the relay 49 is connected to one of the terminals of the right indicator light 41. The other terminals of the indicator lights 41 and 42 are coupled to the zero bus 62. Moving contacts 70 and 71 of the relays 48 and 49 are coupled to the bus 61.

The negative error signal amplifier 37 comprises an operational amplifier 72 and a transistor 73. The inverting input of the operational amplifier 72 is connected through a resistor 74 to a normally closed contact 75 of the relay 47, its moving contact 76 being coupled to a control input 77 of the deviation indicator 14. A normally open contact 78 of the delay 47 is left open.

The inverting input of the operational amplifier 72 is connected via a resistor 79 to the output of the operational amplifier 72 and to the wiper of a potentiometer 80 inserted between buses 61 and 81, the bus 81 being positively biased relative to the zero bus 62 by a d.c. voltage. The non-inverting input of the operational amplifier 72 is coupled to the zero bus 62 via a resistor 82. A terminal 83 of the operational amplifier 72 is connected to the zero bus 62 and power supply terminals 84 and 85 of said operational amplifier are connected to the buses 61 and 81, respectively. The output of the operational amplifier 72 is coupled through a resistor 86 to the base of the transistor 73, the base of said transistor being also connected to resistors 87 and 88 coupled to the zero bus 62 and to the bus 81 and respectively. The emitter of the transistor 73 is connected via a resistor 89 to the zero bus 62. The collector of the transistor 73 is connected to the anode of the right gas-discharge linear indicator 39, its control electrode being connected via a resistor 90 to the zero bus 62 and its cathode being connected to the bus 81.

The positive error signal amplifier 38 incorporates operational amplifiers 91 and 92 and a transistor 93. The inverting input of the operational amplifier 91 is connected via a resistor 94 to the normally closed contact 75 of the relay 47 and via a resistor 95 to the output of the operational amplifier 91. The non-inverting input of the operational amplifier 91 is coupled to the zero bus 62 via resistor 96. The terminal 97 of the operational amplifier 91 is connected to the zero bus 62 and power supply terminals 98 and 99 of said operational amplifier are connected to the buses 61 and 81, respectively. The output of the operational amplifier 91 is connected via a resistor 100 to the inverting input of the operational amplifier 92 and to the wiper of a potentiometer 101, inserted between buses 61 and 81. The inverting input and output of the operational amplifier 92 are joined trough a resistor 102. The non-inverting input of the operational amplifier 92 is connected via a resistor 103 to the zero bus 62. A terminal 104 of the operational amplifier 92 is coupled to the zero bus 62 and terminals 105 and 106 of said operational amplifier are connected to the buses 61 and 81. The output of the operational amplifier 92 is coupled to the base of the transistor 93 through a resistor 107. Connected to the base of the transistor 93 are resistors 108 and 109 coupled to the bus 81 and to the zero bus 62, respectively. The emitter of the transistor 93 is connected through a resistor 110 of the zero bus 62. The collector of the transistor 93 is coupled to the anode of the left gas-discharge indicator 40, its control electrode being connected to the zero bus 62 through a resistor 111, and its cathode being connected to the bus 81.

Figure 3:
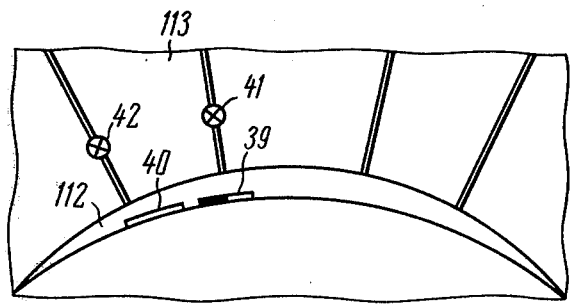
FIG. 3 is a schematic view of the deviation indicator arranged in the cockpit of an aircraft, according to the invention.

FIG. 3 is a schematic view of the arrangement of the lights of the deviation indicator arranged within the aircraft cockpit. The linear gas-discharge indicators 39 and 40 are aligned, fixed to a transom 112 of a canopy wind screen 113, with their glow start points being adjacent. Such an arrangement of the lights within the cockpit does not prevent the pilot from observing external landmarks, the pilot's attention not being captured by the instrument panel. The right-hand indicator light 41 is located near the linear indicator 39, while the left-hand indicator light 42 is located near the linear indicator 40.

Figure 4:
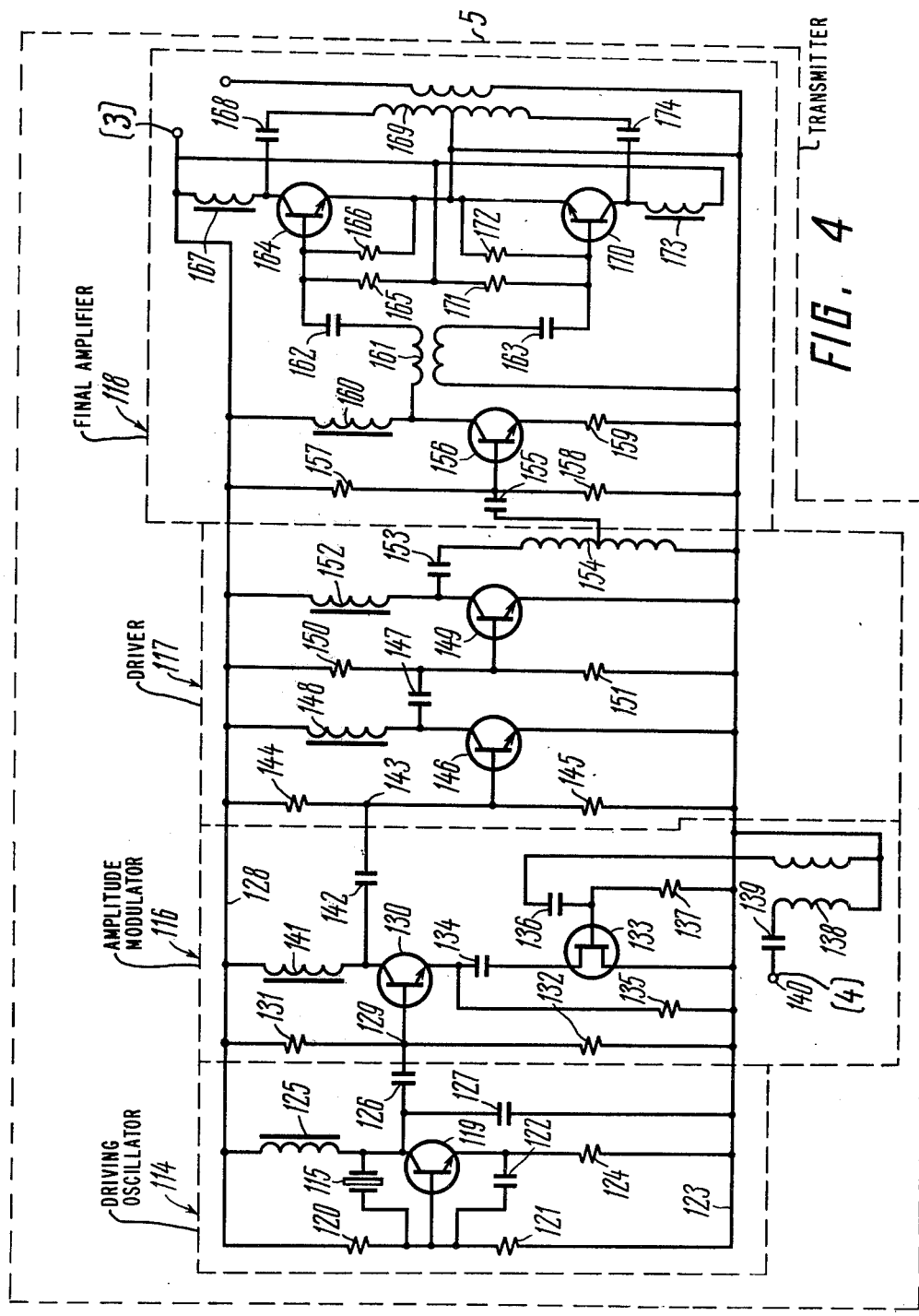
FIG. 4 is an electrical schematic diagram of the transmitter of the ground station, according to the invention.

The transmitter 5 (FIG. 1) of the ground station 1 incorporates a driving oscillator 114 (FIG. 4) controlled by a quartz resonator 115, an amplitude modulator 116, a driver 117 and a final amplifier 118.

The driving oscillator 114 is based on a transistor 119 with its base connected to resistors 120 and 121. The quartz resonator 115 is placed between the base and the collector of the transistor 119, and between its base and its emitter a capacitor 122 is inserted. The emitter of the transistor 119 is connected to a zero bus 123 via a resistor 124, and the collector of said transistor is coupled to a choke 125 and to capacitors 126 and 127. The choke 125 is connected with a bus 128 positively biased with respect to the zero bus 123 by a d.c. voltage. The capacitor 126 is connected to a point 129, which is an output of the driving oscillator 114 and an input of the amplitude modulator 116.

The amplitude modulator 116 incorporates a transistor 130 with its base coupled to the point 129 and to resistors 131 and 132. The transistor 130 has a negative feedback loop with a field-effect transistor 133 and a capacitor 134 inserted therein, said capacitor being connected in series with said field-effect transistor. The capacitor 134 is coupled to the emitter of the transistor 130, a resistor 135 being also connected thereto. The gate of the field-effect transistor 133 is connected with a capacitor 136 and a resistor 137. The capacitor 136 is coupled to the secondary winding of an inductor 138, its primary winding being connected across the capacitor 136 to a terminal 140 of the input of the ground station transmitter.

The collector of the transistor 130 is connected to a choke 141 and to a capacitor 142 which is coupled to a point 143, this point being an output of the amplitude modulator 116 and an input of the driver 117 incorporating two transistors, as shown in the drawing and described below.

Connected to an input 143 of the driver 117 are resistors 144 and 145 and the base of a transistor 146, its collector being coupled to a capacitor 147 and to a choke 148. The capacitor 147 is connected to the base of a transistor 149 and to resistors 150 and 151. The collector of the transistor 149 is connected to a choke 152 and a capacitor 153 which is coupled to a matching autotransformer 154. The center tap of the autotransformer 154 is an output of the driver 117 and an input of the final amplifier 118 connected across a capacitor 155 to the base of a transistor 156 and to resistors 157 and 158. The emitter of the transistor 156 is connected to a resistor 159, and the collector of said transistor is connected to a choke 160 and to the primary winding of a phase shifter 161 coupled to a capacitor 162. The secondary winding of the phase shifter 161 is connected to a capacitor 163. The capacitor 162 is connected to the base of a transistor 164 and to resistors 165 and 166. The collector of the transistor 164 is connected with a choke 167 and, across a capacitor 168, with the primary winding of a transformer 169. The capacitor 163 is coupled to the base of a transistor 170 and to resistors 171 and 172. The transistors 164 and 170 and the elements associated therewith form a push-pull stage of the final amplifier 118.

The collector of the transistor 170 is connected to a choke 173 and, across a capacitor 174, to the primary winding of the transformer 169. The secondary winding of the transformer 169 is coupled to the output of the transmitter of the ground station.

Connected to the bus 123 are the resistors 121, 124, 132, 135, 137, 145, 151, 158, 159, 166 and 172, the capacitor 127, the source of the field-effect transistor 133, the emitters of the transistors 146, 149, 164 and 170, the windings of the inductor 138, the matching autotransformer 154, the secondary winding of the pulse-shifter 161, the center tap of the primary winding of the transformer 169 and its secondary winding.

Connected to the bus 128 are the resistors 120, 131, 144, 150, 157, 165 and 171 and the chokes 125, 141, 148, 152, 160, 167 and 173.

The circuit of the transmitter 6 (FIG. 1) of the airborne equipment 2 is identical in design with the transmitter 5 of the ground station.

Figure 5:
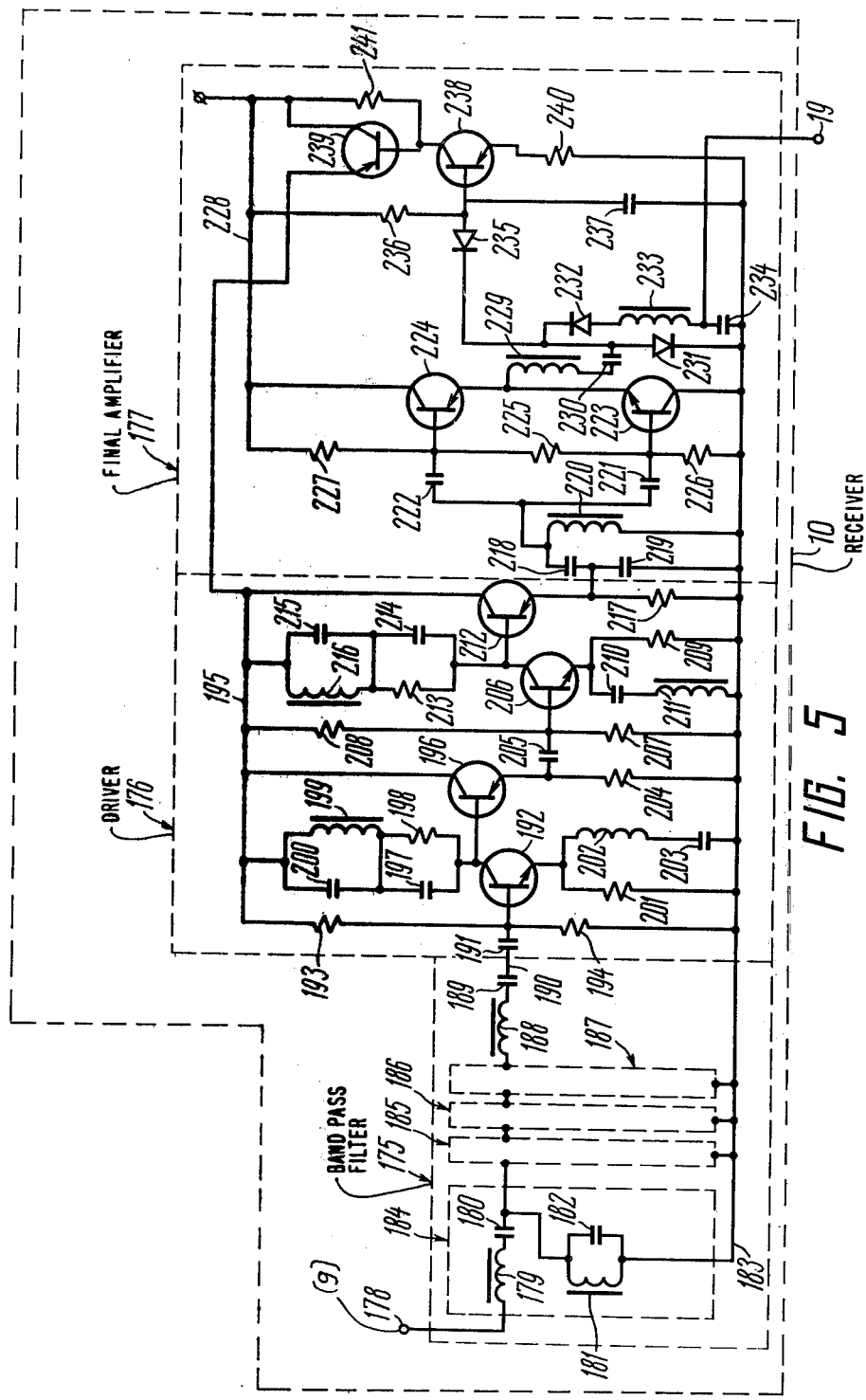
FIG. 5 is an electrical schematic diagram of the receiver of the airborne equipment, according to the invention.

In the airborne equipment 2, the receiver 10 is essentially a tuned radio frequency receiver consisting of a band-pass filter 175 (FIG. 5), a driver 176 and a final amplifier 177 provided with a detector circuit and an automatic gain control circuit.

Connected to an input 178 of the band-pass filter 175, which is connected to the input of the receiver 10 of the airborne equipment 2, in a series circuit consisting of an inductor 179 and a capacitor 180. A parallel circuit formed by an inductor 181 and a capacitor 182 is coupled to the capacitor 180 and to a zero bus 183. The inductors 179 and 181 and the capacitors 180 and 182 form a first L-section 184 of the band-pass filter 175. Connected in series to the output of the L-section 184 are L-sections 185, 186 and 187 which are identical in design to the L-section 184. The output of the last L-section 187 is connected via an inductor 188 and a capacitor 189 with a point 190 forming the output of the band-pass filter 175. Connected to the point 190 via a capacitor 191 are the base of a transistor 192 and resistors 193 and 194, said resistors being coupled to a bus 195 and to the zero bus 183, respectively. The collector of the transistor 192 is connected to the base of an emitter follower using a transistor 196 and through a capacitor 197 and a resistor 198 to a parallel circuit formed by an inductor 199 and a capacitor 200, and connected to the bus 195. The emitter of the transistor 192 is coupled to a resistor 201 and to a series circuit formed by an inductor 202 and a capacitor 203. The resistor 201 and the capacitor 203 are connected to the zero bus 183. The emitter of the transistor 196 is coupled to a resistor 204 connected with the zero bus 183 and, via a capacitor 205, to the base of a transistor 206 and to resistors 207 and 208 which are connected with the zero bus 183 and the bus 195, respectively. The emitter of the transistor 206 is connected to a resistor 209 and to a series circuit consisting of a capacitor 210 and an inductor 211. The resistor 209 and the inductor 211 are connected to the zero bus 183. The collector of the transistor 206 is coupled to the base of an emitter follower constructed with a transistor 212 and, through a resistor 213 and a capacitor 214, to a parallel circuit formed by a capacitor 215 and an inductor 216 and connected to the bus 195. The emitter of the transistor 212 serves as an output of the driver 176 and is connected to the zero bus 183 via a resistor 217.

The emitter of the transistor 212 is also connected to the resonant circuit of the final amplifier 177 consisting of capacitors 218 and 219 and an inductor 220. This resonant circuit is connected across capacitors 221 and 222, to the bases of transistors 223 and 224, respectively, and to a resistor 225 placed between the bases these transistors. The base of the transistor 223 is coupled through a resistor 226 to the zero bus 183, its collector being directly connected to the zero bus 183. The base of the transistor 224 is connected via a resistor 227 to a bus 228 biased with respect to the zero bus 183 by a d.c. voltage. The collector of the transistor 224 is coupled to the bus 228. The emitters of the transistors 223 and 224 are connected, through an inductor 229 and a capacitor 230, to an amplitude detector based on diodes 231 and 232, to a low-pass filter consisting of an inductor 233 and a capacitor 234, and to a diode 235 which serves as a detector of the automatic gain control circuit. The junction point of the inductor 233 and the capacitor 234 constitutes the output 19 of the ground station receiver.

The diode 235 is connected to a resistor 236 coupled to the bus 228, to a capacitor 237 coupled to the zero bus 183, and to the base of a transistor 238, the transistor 238 together with a transistor 239 forming an amplifier of the automatic gain control circuit. The emitter of the transistor 238 is connected via a resistor 240 to the zero bus 183. The collector of the transistor 238 is connected to the base of the transistor 239 and to a resistor 241, the resistor 241 together with the collector of the transistor 239 being coupled to the bus 228. The emitter of the transistor 239 is connected to the bus 195.

Figure 6:
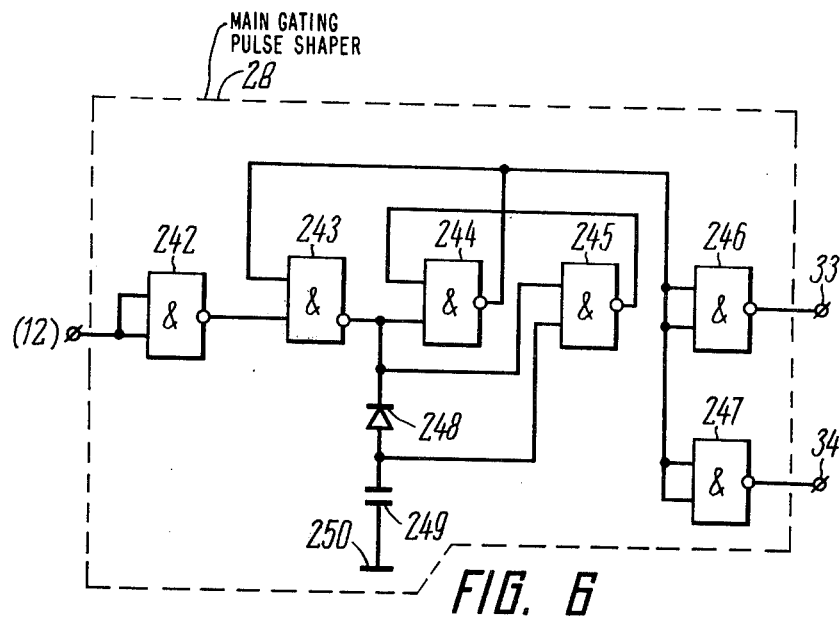
FIG. 6 is a block diagram of the main gating pulse shaper, according to the invention.

FIG. 6 is a block diagram of the main gating pulse shaper. The main gating pulse shaper incorporates NAND logic elements 242 through 247, a diode 248 and a time setting capacitor 249. The inputs of the logic element 242 are interconnected and are connected to the input of the main gating pulse shaper 28. The output of the logic element 242 is connected to one input of the logic element 243. The other input of the logic element 243 is coupled to the output of the logic element 244 and to the inputs of the logic elements 246 and 247. The output of the logic element 243 is connected to one input of the logic element 244, to one input of the logic element 245 and to the cathode of the diode 248. The anode of the diode 248 is connected to the capacitor 249 and to the other input of the logic element 245. The capacitor 249 is coupled to a zero bus 250. The output of the logic element 245 is connected to the other input of the logic element 244. The outputs of the logic elements 246 and 247 are connected respectively to form the outputs 33 and 34 of the main gating pulse shaper 28.

Figure 7:
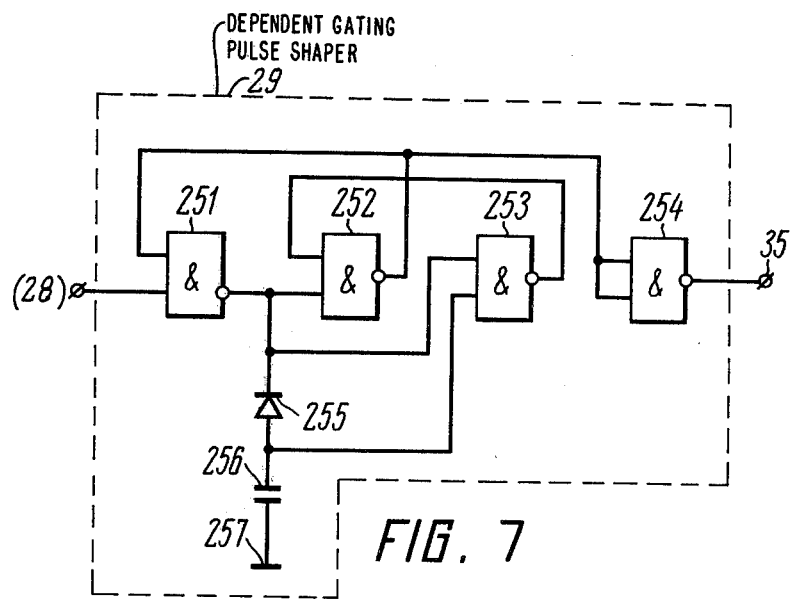
FIG. 7 is a block diagram of the dependent gating pulse shaper, according to the invention.

FIG. 7 is a block diagram of the dependent gating pulse shaper 29. The dependent gating pulse shaper includes NAND logic elements 251 through 254, a diode 255 and a time setting capacitor 256. The first input of the logic element 251 is connected to the input of the dependent gating pulse shaper 29. The second input of the logic element 251 is connected to the output of the logic element 252 and to the inputs of the logic element 254. The output of the logic element 251 is connected to the first input of the logic element 252, to the first input of the logic element 253 and to the cathode of the diode 255. The anode of the diode 255 is coupled to the second input of the logic element 253 and to the capacitor 256, the capacitor 256 being connected to a zero bus 257. The second input of the logic element 252 is connected to the output of the logic element 253. The output of the logic element 254 constitutes an output 35 of the dependent gating pulse shaper.

Figure 8:
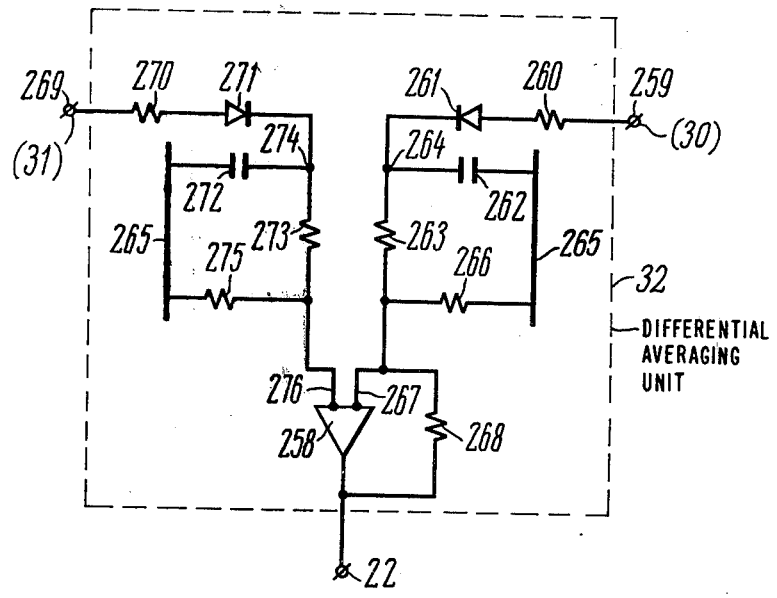
FIG. 8 is an electrical schematic diagram of the differential averaging unit, according to the invention.

Shown in FIG. 8 is an electrical circuit of the differential averaging unit 32. The differential averaging unit 32 incorporates two input integrating circuits and an operational amplifier 258. An input 259 of one of the input integrating circuits is connected to one of the inputs input of the differential averaging unit 32. The first input integrating circuit is formed by a resistor 260, a diode 261, a capacitor 262 and a resistor 263. The resistor 260 is coupled to the input 259 of the differential averaging unit 32 and to the anode of the diode 264. The cathode of the diode 264 is connected at 264 to the capacitor 262 coupled to a zero bus 265, and to the resistor 263. The resistor 263 is connected to a resistor 266 connected to the zero bus 265 at a point 267, the output of the first input integrating circuit being taken therefrom. The point 267 is coupled to the inverting input of the operational amplifier 258. A resistor 268 is inserted between the inverting input of the operational amplifier 258 and its output. The error signal output 22 of the processing unit 13 is connected to the output of the operational amplifier 258.

An input 269 of the second input integrating circuit is connected to the other input of the differential averaging unit 32. The second integrating circuit comprises a resistor 270, a diode 271, a capacitor 272 and a resistor 273. The resistor 270 is connected to the input 269 of the differential averaging unit 32 and to the anode of the diode 271. The cathode of the diode 264 is connected at 274 to the capacitor 272 coupled to the zero bus 265, and to the resistor 273. The resistor 273 is connected to the resistor 275 which is coupled to the zero bus 265 at a point 276, the point 276 being the output of the second integrating circuit. The point 276 is connected to the non-inverting input of the operational amplifier 258.

Figure 9:
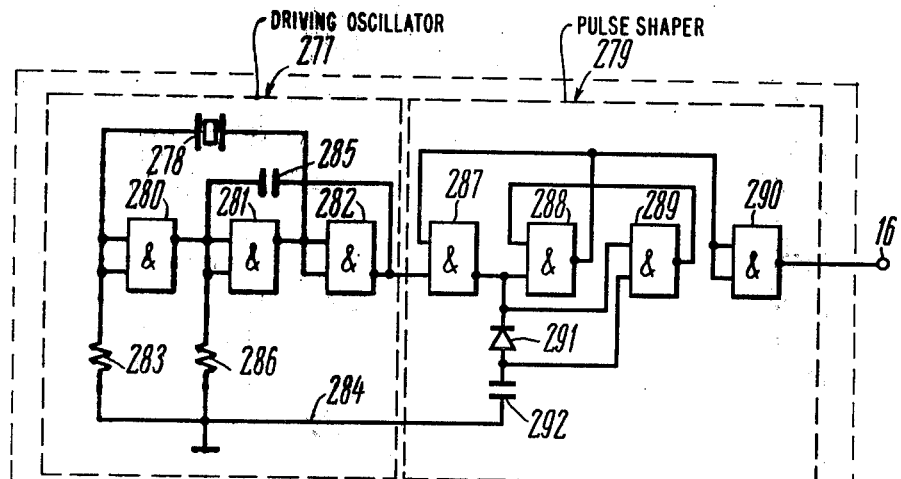
FIG. 9 is a block diagram of the reference-frequency oscillator, according to the invention.

FIG. 9 is a block diagram of the reference-frequency oscillator 6. The reference-frequency oscillator 6 incorporates a driving oscillator 277 locked in synchronism by a crystal resonator 278, and a pulse shaper 279.

The driving oscillator 277 is based on NAND logic elements 280, 281 and 282 in a multivibrator configuration with the crystal resonator 278 in its feedback loop. The inputs of the logic element 280 are connected to the crystal resonator 278 and to a resistor 283 coupled to a zero bus 284. The output of the logic element 280 is connected to the inputs of the logic element 281, to a capacitor 285 and to a resistor 286, the resistor 286 being connected to the zero bus 284. The output of the logic element 281 is coupled to the inputs of the logic element 282 and to the crystal resonator 278. The capacitor 285 is connected to the output of the logic element 282 which constitutes the output of the driving oscillator 277.

The pulse shaper 279 is based on NAND logic elements 287, 288, 289 and 290 as a single-shot multivibrator. One input of the logic element 287 is connected to the output of the logic element 282. Another input of the logic element 287 is connected to the output of the logic element 288 and to the inputs of the logic element 290. The output of the logic element 287 is connected with one input of the logic element 288, with the cathode of a diode 291 and with one input of the logic element 289. The anode of the diode 291 is connected to the other input of the logic element 289 and, across a capacitor 292, to the zero bus 284. The other input of the logic element 288 is coupled to the output of the logic element 289. The output of the logic element 290 is connected to the output 16 of the reference-frequency oscillator 6.

Figure 10:
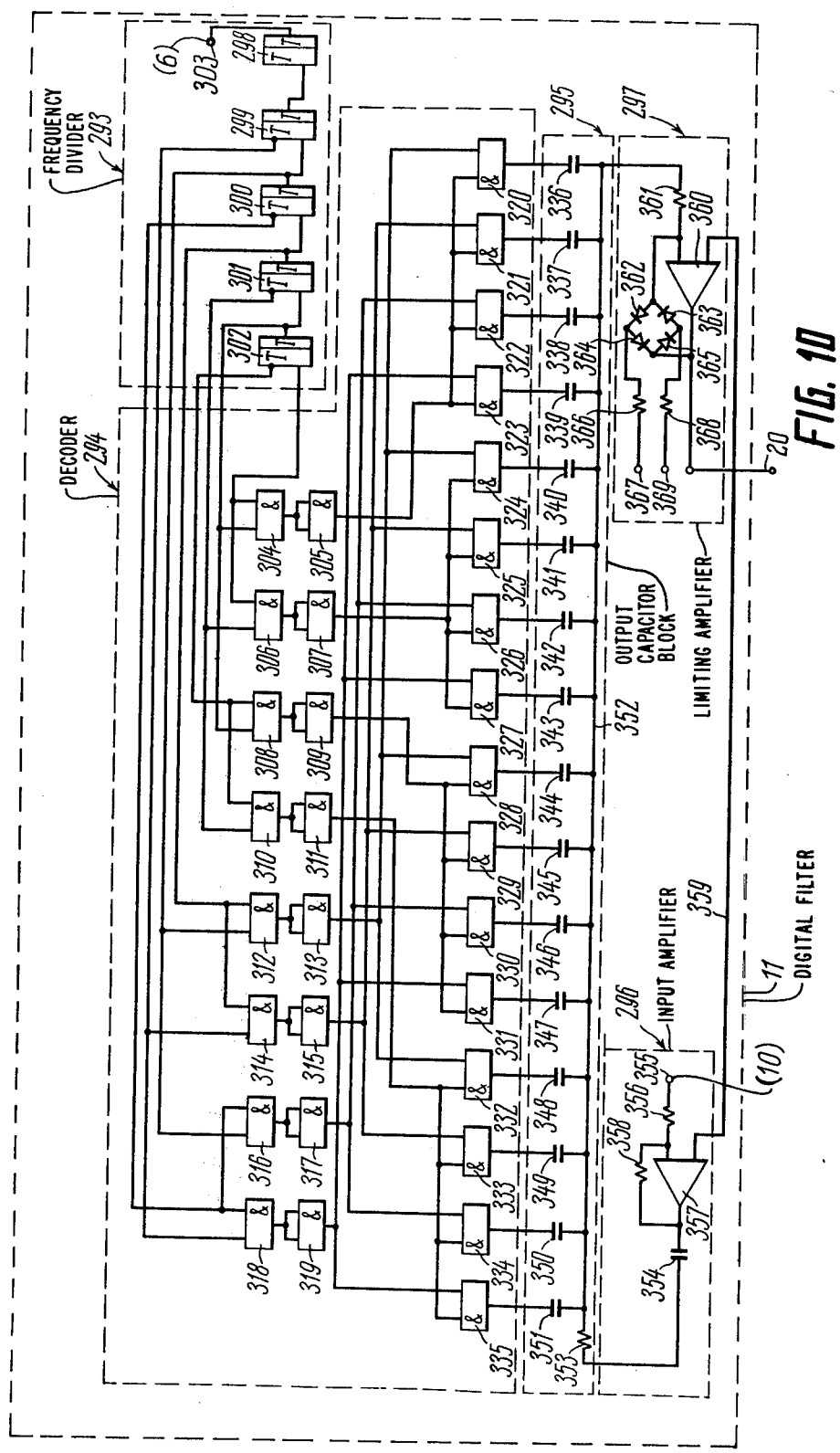
FIG. 10 is a block diagram of the digital filter, according to the invention.

FIG. 10 is a block diagram of the digital filter 11. The digital filter 11 comprises a frequency divider 293, a decoder 294, an output capacitor block 295, an input amplifier 296 and a limiting amplifier 297.

The frequency divider 293 incirporates T-flip-flops 298, 299, 300, 301 and 302. A complementing input 303 of the flip-flop 298 is connected to the second input of the digital filter 11. The direct output of the flip-flop 298 is connected to the complementing input of the flip-flop 299. The direct output of the flip-flop 299 is connected to the complementing input of the flip-flop 300. The direct output of the flip-flop 300 is connected to the complementing input of the flip-flop 301. The direct output of the flip-flop 301 is coupled to the complementing input of the flip-flop 302.

The decoder 294 incorporates sixteen NAND logic elements 304–319 and sixteen NAND logic elements 320–335 with open-ended collectors. Connected to the direct output of the flip-flop 299 are the first inputs of the logic elements 312 316, and the first inputs of the logic elements 314 and 318 are connected to the inverted output of the flip-flop 299. The second inputs of the logic elements 312 and 314 are connected to the direct output of the flip-flop 300 and the second inputs of the logic elements 316 and 318 are connected to the inverted output of the flip-flop 300.

Connected to the direct output of the flip-flop 301 are the first inputs of the logic elements 304 and 308, and the first inputs of the logic elements 306 and 310 are connected to the inverted output of the flip-flop 301. The second inputs of the logic elements 304 and 306 are coupled to the direct output of the flip-flop 302, and the inverted output of the flip-flop 302 is connected to the second inputs of the logic elements 308 and 310.

The outputs of the logic elements 304, 306, 308, 310, 312, 314, 316 and 318 are connected to the inputs of the logic elements 305, 307, 309, 311, 313, 315, 317 and 319, respectively.

Connected to the output of the logic element 305 are the first inputs of the logic elements 320, 321, 322 and 323. The first inputs of the logic elements 324, 325, 326 and 327 are connected to the output of the logic element 307. The first inputs of the logic elements 328, 329, 330 and 331 are connected to the output of the logic element 309. Connected to the output of the logic element 311 are the first inputs of the logic elements 332, 333, 334 and 335. The second inputs of the logic elements 320, 324, 328 and 332 are coupled to the output of the logic element 313. The output of the logic element 315 is connected to the second inputs of the logic elements 321, 325, 329 and 333. Connected to the output of the logic element 317 are the second inputs of the logic elements 322, 326, 330 and 334. The second inputs of the logic elements 323, 327, 331 and 335 are connected to the output of the logic element 319.

The output capacitor block 295 comprises sixteen capacitors 336–351. One terminal of each of the capacitors 336–351 is connected to the output of a respective logic elements 320–335. The other terminals of the capacitors 336–351 are coupled to a bus 352 connected, through a resistor 353, to a capacitor 354 of the input amplifier 296.

An input 355 of the input amplifier 296 is connected to the first input of the digital filter. The input 355 is connected via a resistor 356 to the inverting input of an operational amplifier 357. A resistor 358 is inserted between the inverting input and the output of the operational amplifier 357. The output of the operational amplifier 357 is connected to the capacitor 354. The non-inverting input of the operational amplifier 357 is coupled to a zero bus 359.

The limiting amplifier 297 incorporates an operational amplifier 360, the non-inverting input of said operational amplifier being connected to the zero bus 359. The inverting input of the operational amplifier 360 is connected via a resistor 361 to the bus 352. Inserted between the inverting input and the output of the operational amplifier are diodes 362, 363, 364 and 365 adapted for providing a special non-linear transfer characteristic of the limiting amplifier 297. The cathode of the diode 362 and the anode of the diode 364 are connected through a resistor 366 to a point 367 positively biased with respect to the zero bus 359 by a direct current voltage. The cathode of the diode 365 and the anode of the diode 363 are connected through a resistor 368 to a point 369 negatively biased with respect to the zero bus 359 by a direct current voltage. The output of the operational amplifier 360 is connected to the output 20 of the digital filter.

The variable delay unit 12 comprises lumped-constant delay lines 370, 371 and 372 (FIG. 11), pulse shapers 373, 374, 375 and 375 capacitors 376, 377 and 378, tunnel diodes 379, 380 and 381 and resistors 382, 383, 384.

An input 385 of the pulse shaper 373 is connected to the first input of the variable delay unit.

The output of the pulse shaper 373 is connected to the input of the delay line 370 and, across the capacitor 376, to the input of the pulse shaper 374, to the resistor 382 and to the cathode of the tunnel diode 379. The output of the pulse shaper 374 is connected to the input of the delay line 371, and across the capacitor 377 to the input of the pulse shaper 375, to the cathode of the tunnel diode 380 and to the resistor 383. The output of the pulse shaper 375 is coupled to the input of the delay line 372, and via the capacitor 378 to the input of the pulse shaper 375 to the cathode of the tunnel diode 381 and to the resistor 384. The output of the pulse shaper 375 is connected to the output 21 of the variable delay unit 12.

The anodes of the tunnel diodes are connected to a zero bus 386. The resistors 382, 383 and 384 are coupled to a bus 387 negatively biased with respect to the zero bus by a direct current voltage.

The input 385 of the pulse shaper 373 is connected across a capacitor 388 to resistors 389 and 390, and to the base of a transistor 391. The collector of the transistor 391 is connected to the resistor 390, to the cathode of a diode 392 and to the primary winding of a transformer 393. The anode of the diode 392 and the primary winding of the transformer 393 are connected to the bus 387. The emitter of the transistor 391, the resistor 389 and the secondary winding of the transformer 393 are connected to the zero bus 386. Another terminal of the secondary winding of the transformer 393 is coupled to a resistor 394.

The pulse shapers 374, 375 and 375 have the same configuration.

Each of the delay lines 370, 371 and 372 has ten taps. The taps of the delay line 370 are connected to buses 395–404, the taps of the delay line 371 are connected to buses 405–414 and the taps of the delay line 372 are connected to buses 415–424.

The buses 395–424 are connected to the second input of the variable delay unit 12.

The control unit 15 (FIG. 12) comprises a zero-finding circuit 425 designed for indicating an initial equidistant track on the deviation indicator, a track change-over circuit 426 for indicating subsequent equidistant tracks on the deviation indicator, and a variable delay unit control circuit 427 for setting the value of the reference pulse delay in the variable delay unit.

An input 428 of the zero-finding circuit 425 is connected to the input of the control unit 15. Another input of the zero-finding circuit 425 is connected to buses 429 and 430 and coupled to the command input 25 of the control unit 15. The bus 429 is also connected to a first input of the variable delay unit control circuit 427. The input of the track change-over circuit 426 is connected to buses 431, and 432 which are coupled to the command input 26 of the control unit 15. Another input of the selected track transfer circuit 426 is connected through a bus 433 to the third input of the zero-finding circuit 425 and to the output of the variable delay unit control circuit 427.

Three clock pulse inputs of the zero-finding circuit 425 are connected via buses 434, 435 and 436 with three outputs of the track change-over circuit 426. The zero-finding circuit 425 has two pairs of reversal signal inputs connected by buses 437, 438, 439 and 440 to two pairs of reversal signal inputs of the variable delay unit control unit 427, respectively. Two clock pulse outputs of the zero-finding circuit 425 are coupled via buses 441 and 442 to two clock pulse inputs of the variable delay unit control circuit 427. A set of outputs of the variable delay unit control circuit 427, connected to the buses 395 424, is connected to the output 27 of the control unit 15.

Figure 13:
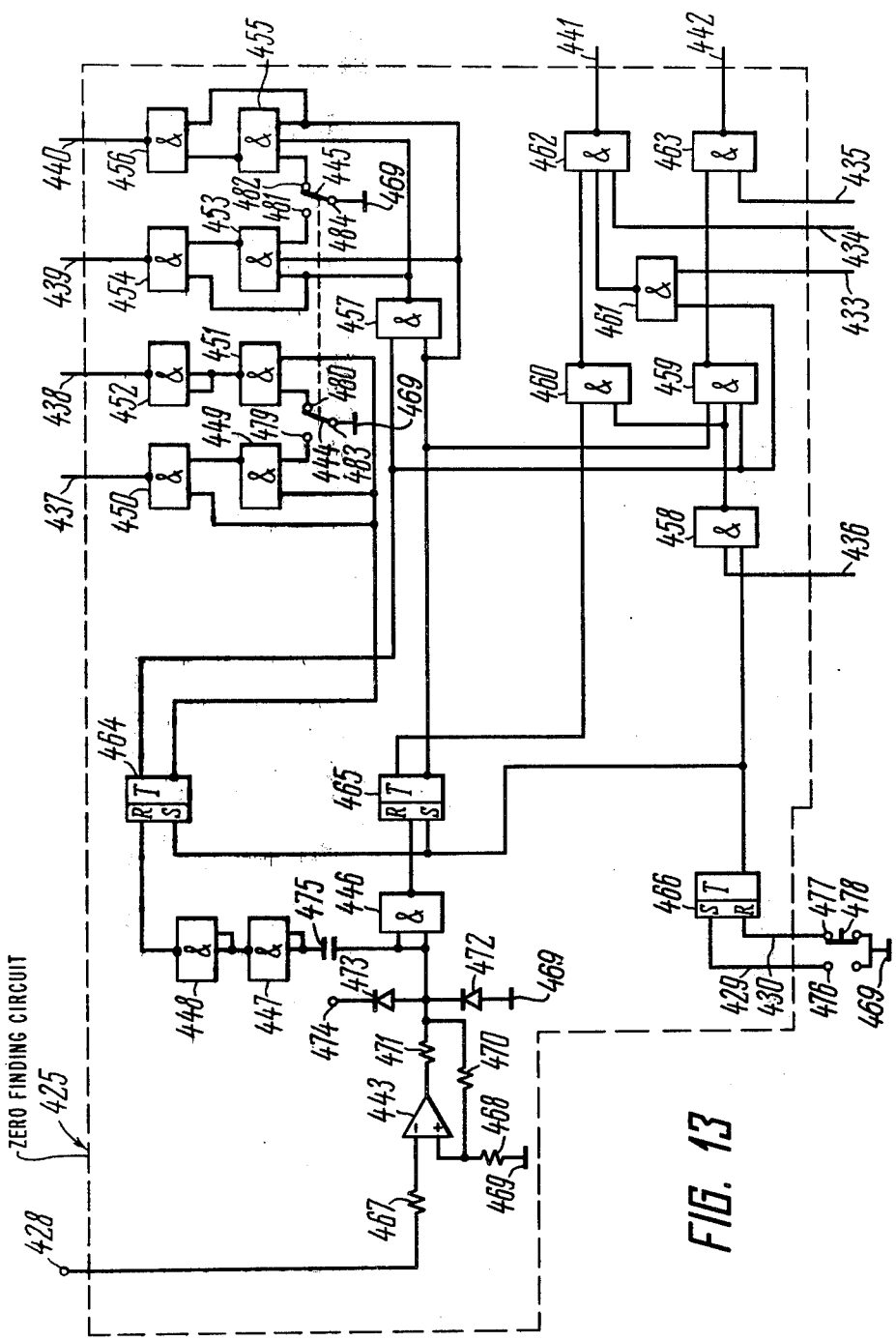
FIG. 13 is a block diagram of a zero-finding circuit, according to the invention.

FIG. 13 is a circuit 425 diagram of the zero-finding circuit. The zero-finding circuit 425 incorporates an operational amplifier 443 responsive to passage of an error signal through zero, two switches 444, 445 adapted to reverse the direction of the reference pulse shift in the unit 12 (FIG. 1), NAND logic elements 446-463 (FIG. 13) and RS-flip-flops 464, 465 and 466.

As it will be shown below when describing the operation of the control unit, the operational amplifier 443 ensures an operative coupling of the clock pulse input of the zero-finding circuit, tied to the bus 436, with the clock pulse output of the zero-finding circuit tied to the bus 441, within the interval between the input of the command to the input 25 (FIG. 12) of the zero-finding circuit and the first passage through zero of the error signal, as well as an operative coupling with another clock pulse output of the zero-finding circuit, tied to the bus 442, within the interval between the first and the second passages through zero of the error signal.

The inverting input of the operational amplifier 443 (FIG. 13) is connected via a resistor 467 to the input 428 of the zero-finding circuit 425. The non-inverting input of the operational amplifier 443 is tied via a resistor 468 to a zero bus 469. Connected to the non-inverting input of the operational amplifier 443 is also a resistor 470. The output of the operational amplifier 443 is connected to a resistor 471. The resistors 470 and 471 are coupled to the cathode of a diode 472 whose anode is connected to the zero bus 469, and to the anode of a diode 473 whose cathode is connected to a point 474, biased to a positive potential with respect to the zero bus 469 by a d.c. voltage.

The output of the operational amplifier 443 is connected to the inputs of the logic element 446 via the resistor 471, and to the inputs of the logic element 447 across a capacitor 475. The output of the logic element 446 is connected to the R-input of the RS-flip-flop 465 whose direct output is coupled to the first input of the logic element 460. The output of the logic element 460 is connected to the first input of the logic element 462, its output being connected to the bus 441. Connected to the inverted output of the flip-flop are the first inputs of the logic elements 453, 455, 456, 457 and 459. The output of the logic element 459 is coupled to the first input of the logic element 463 whose output is connected to the bus 442. Thus, the output of the operational amplifier 443 is operatively associated with two clock pulse outputs of the zero-finding circuits, i.e. with the buses 441 and 442.

The buses 429, and 430 connected to the second input of the zero-finding circuit are connected, respectively, to the S-input and R-input of the RS-flip-flop 446, and to a normally open contact 476 and a normally closed contact 447 of a button 478 arranged on the control panel (not shown) in the cockpit. Other contacts of said button are tied to the zero bus 469.

The bus 433 connected to the third input of the zero-finding circuit is connected to the first input of the logic element 461 whose output is coupled to the second input of the logic element 462. The bus 434 constituting a first clock pulse input of the zero-finding circuit is connected to the third input of the logic element 462. The output of the logic element 462 is coupled to the bus 441. Thus, an operative coupling is provided between the third and the first clock pulse inputs of the zero-finding circuit, and the first clock pulse output of the zero finding circuit.

The bus 435 connected to the second clock pulse input of the zero-finding circuit is connected to the second input of the logic element 463 and, across the output of said logic element, to the bus 442, the bus 442 being connected to the second clock pulse output of the zero finding circuit.

The bus 446, which is connected to the third clock pulse input of the zero-finding circuit, is connected to the first input of the logic element 458. The second input of the logic element 458 is connected to the output of the flip-flop 446 and to the S-inputs of the flip-flops 464 and 465. The output of the logic element 458 is coupled to the second inputs of the logic elements 459 and 460.

The output of the logic element 447 is connected to the input of the logic element 448 whose output is coupled to the R-input of the flip-flop 464. The direct output of the flip-flop 464 is connected to the second input of the logic element 457, to the third input of the logic element 459 and to the second input of the logic element 461. Connected to the inverted output of the flip-flop 464 are the first inputs of the logic elements 449, 450 and 451. Contacts 479 and 480 of the switch 444 are coupled to the second inputs of the logic elements 449 and 451, respectively. The output of the logic element 449 is connected to the second input of the logic element 450 whose output is connected to the bus 437, the bus 437 being connected to first output of one pair of the reversal signal outputs of the zero-finding circuit.

The output of the logic element 451 is connected to the inputs of the logic element 452 whose output is coupled to the bus 438, the bus 438 being connected to the second output of one pair of reversal signal outputs of the zero-finding circuit. Thus, the contacts 479 and 480 of the switch 444 are respectively coupled via the logic elements 449 and 450 and via the logic elements 451 and 452 with the outputs of one pair of reversal signal outputs of the zero-finding circuit.

The output of the logic element 457 is connected to the second inputs of the logic elements 453 and 455 and to the first input of the logic element 454. Contacts 481 and 482 of the switch 445 are connected to the third inputs of the logic elements 453, 455, respectively. The output of the logic element 453 is connected to the second input of the logic element 454 whose output is coupled to the bus 439 which is connected to the first output of another pair of reversal signal outputs of the zero finding circuit. The output of the logic element 455 is connected to the second input of the logic element 456 whose output is connected to the bus 440 which is connected to the second output of the other pair of reversal signal outputs of the zero-finding circuit. Thus and the contacts 481 and 482 of the switch 445 are coupled via the logic elements 453 and 454 and via the logic elements 455 and 456 with the outputs of the other pair of reversal signal outputs of the zero-finding circuit.

Change-over contacts 483 and 484 of the switches 444 and 445, respectively, are mechanically interconnected and tied to the zero bus 469.

Figure 14:
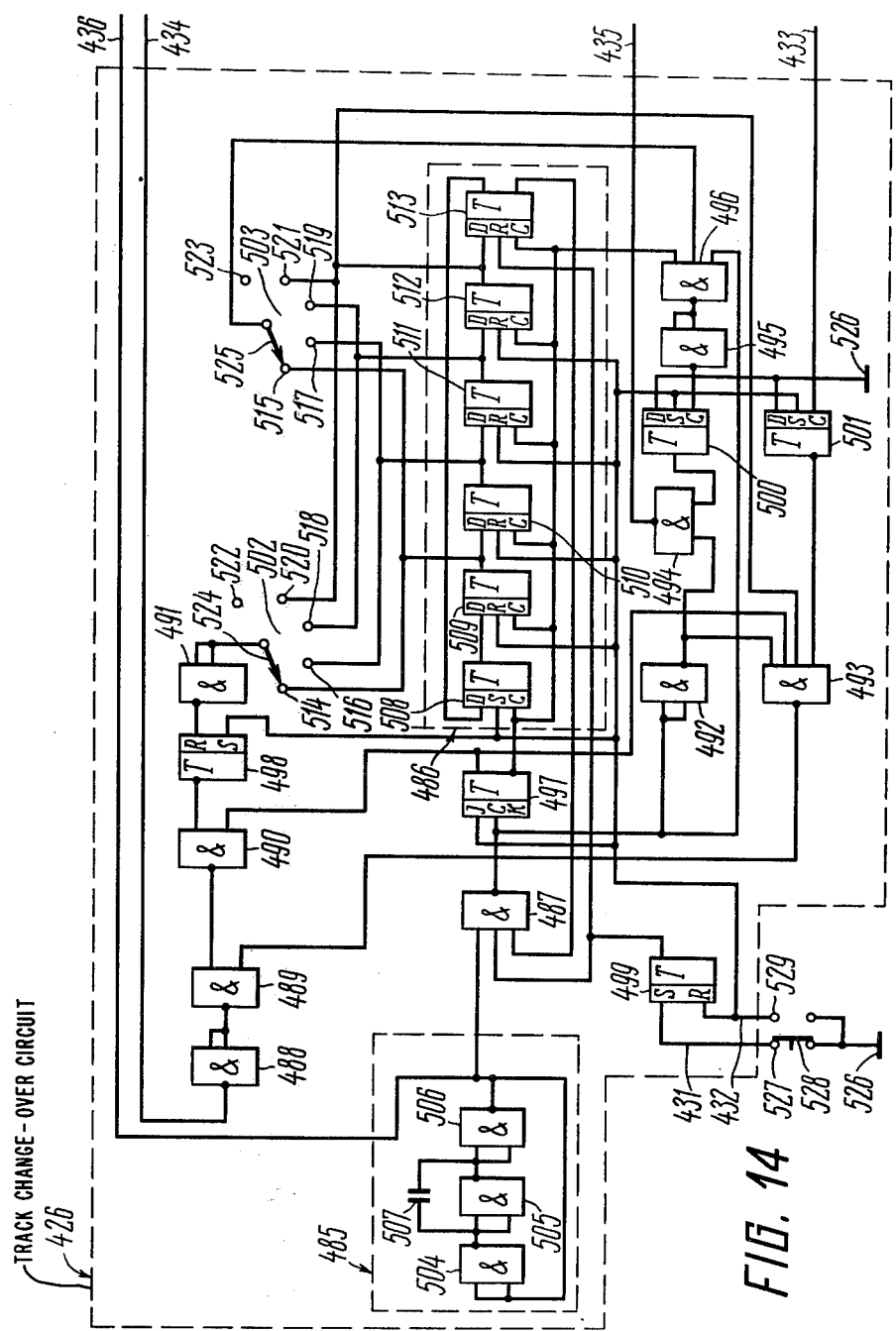
FIG. 14 is a block diagram of a track change-over circuit, according to the invention.

Shown in FIG. 14 is the track change-over circuit 426. The track changeover circuit 426 incorporates a clock 485, a register 486, NAND logic elements 487-496, a JK-flip-flop 497, RS-flip-flops 498 and 499, D-flip-flops 500 and 501 and track-to-track distance switches 502 and 503 for counting clock pulses delivered to the first input 434 and to the second input 435 of the track change-over circuit, as will be shown below when describing the operation of the control unit.

The buses 431 and 432 forming the first input 26 (FIG. 12) of the track change-over circuit 426 are connected to the S-input and the R-input of the flip-flop 499 (FIG. 14), respectively.

The bus 433 connected to the second input of the track change-over circuit 426 is connected to the C-input of the flip-flop 501 whose output is coupled to the first input of the logic element 493. The output of the logic element 493 is connected to the first input of the logic element 489. The output of the logic element 489 is coupled to the inputs of the logic element 488 whose output is connected to the bus 434 connected to the first output of the track change-over circuit 426. Thus, the second input of the track change-over circuit 426 is associated across the flip-flop 501 and across the logic elements 493, 489 and 488 to the first output of the track change-over circuit.

The clock 485 is composed of NAND logic elements 504, 505 and 506 and a capacitor 507 forming a single-shot multivibrator. The output of the logic element 504 is tied to the inputs of the logic element 505 and across the capacitor 507 to the output of the logic element 505 and to the inputs of the logic element 506. The output of the logic element 506, which is the output of the clock 485 and is connected to the third output of the track change-over circuit, connected to the bus 436, is coupled to the inputs of the logic element 504 and to the first input of the logic element 487. The output of the logic element 487 is connected to the C-input of the JK-flip-flop 497, to the inputs of the logic element 492 and to the first input of the logic element 496. The direct output of the JK-flip-flop 497 is coupled to the first input of the logic element 490 and to the second input of the logic element 493.

The register 486 comprises several bits formed by flip-flops 508-513. C-inputs of said flip-flops are reciprocally coupled and are connected to the input of the register 486. The C-input of the flip-flops 508-513 are connected to the inverted output of the flip-flop 497 and to the second input of the logic element 496. Thus, the input of the register 486 is associated across the flip-flop 497 and across the logic element 487 with the output of the clock 485. Connected to the bus 432 are R-inputs of the flip-flops 509-512, S-inputs of the flip-flops 508, 498, 500 and 501 and a J-input of the flip-flop 497. An R-input of the flip-flop 513 is connected to the output of the flip-flop 499 and to the second input of the logic element 487.

The direct output of the flip-flop 508 is tied to a D-input of the flip-flop 509. The direct output of the flip-flop 509 is connected to a D-input of the flip-flop 510, to a contact 514 of the track-to-track distance switch 502 and to a contact 515 of the track-to-track distance switch 503. The direct output of the flip-flop 510 is connected to a D-input of the flip-flop 511, to a contact 516 of the track-to-track distance switch 502 and to a contact 517 of the track-to-track distance switch 503. The direct output of the flip-flop 511 is connected to a D-input of the flip-flop 512, to a contact 518 of the track-to-track distance switch 502 and to a contact 519 of the track-to-track distance switch 503. The direct output of the flip-flop 512 is connected to a D-input of the flip-flop 513, to a contact 520 of the track-to-track distance switch 502, to a contact 521 of the track-to-track distance switch 503, and to the third input of the logic element 493. Contacts 522 and 523 of the track-to-track distance switches 502, 503 are open-ended.

The direct output of the flip-flop 513 is connected to a D-input of the flip-flop 508. The inverted output of the flip-flop 513 is coupled to the third input of the logic element 487.

A change-over contact 524 of the track-to-track distance switch 502 is coupled to the inputs of the logic element 491 whose output is coupled to an R-input of the RS-flip-flop 498. The direct output of the flip-flop 498 is connected to the second input of the logic element 490 whose output is coupled to the second input of the logic element 489. Thus, the change-over contact 524 of the track-to-track distance switch 502 is associated, across the logic element 491, the flip-flop 498 and the logic elements 490, 489 and 488, with the bus 434, i.e. with the first output of the track change-over circuit.

A change-over contact 525 of the track-to-track distance switch 503 is tied to the third input of the logic element 496 whose output is connected to the inputs of the logic element 495. The output of the logic element 495 is connected to a C-input of the flip-flop 500. The direct output of the flip-flop 500 is connected to the first input of the logic element 494 whose output is tied to the bus 435. Thus, the change-over contact 525 of the track-to-track distance switch 503 is associated, across the logic elements 496 and 495, flip-flop 500 and the logic element 494, with the second output of the selected track transfer circuit, i.e. with the bus 435.

D-inputs of the flip-flops 500 and 501 are coupled to a zero bus 526. The second input of the logic element 494 is connected to the output of the logic element 492 and to the fourth input of the logic element 493.

Connected to the bus 431 is a normally closed contact 527 of a button 528 mounted e.g. on the control panel (not shown) in the pilot's cockpit. A normally open contact 529 of the button 528 is connected to the bus 432. The remaining contacts of this button are connected to the zero bus 526.

The variable delay unit control circuit 427 comprises reversible shift registers 530 (FIG. 15), 531 and 532, each having ten bit locations, and two OR gate circuits 533 and 533'. The gate circuit 533 incorporates NAND logic elements 534, 534' and 535. A first bit location 536 of the reversal shift register 530 incorporates a D-flip-flop 537 and NAND logic elements 538, 539 and 540. A second bit location 541 of the reversible shift register 530 includes a D-flip-flop 542 and NAND logic elements 543, 544 and 545. The remaining bit eight locations 546-553 of the registers 530 comprise similar elements.

The inputs of NAND logic elements 554-563 having open-ended collectors are connected, respectively, to the outputs 564-573 of the bit locations 536, 541, 546-553 of the reversible shift register 530. The outputs of the logic elements 554-563 are coupled to the buses 359-404, respectively.

A D-input of the flip-flop 537 is connected to the output of the NAND logic element 538. The first input of the NAND logic element 538 is connected to the output of the NAND logic element 539, the second input of the logic element 538 being connected to the output of the logic element 540. The output of the D-flip-flop 537 is coupled to the bus 564. A D-input of the D-flip-flop 542 is connected to the output of the logic element 543. The first input of the logic element 543 is connected to the output of the NAND logic element 544. The output of the D-flip-flop 542 is tied to the bus 565. The second input of the logic element 543 is connected to the output of the logic element 545.

A R-input of the flip-flop 537 of the bit location 536, a R-input of the flip-flop 542 of the bit location 541 and a R-input of the flip-flops (not shown) of the bit location 546–553 are reciprocally coupled and connected to the reset input of the register 530, and coupled to the bus 429. C-inputs of the flip-flop 537 of the bit location 536, of the flip-flop 542 of the bit location 541 and of the flip-flops (not shown) of the bit locations 546–553 of the register 530 are reciprocally coupled and form connected to complementing input of the register 530, connected to the bus 441, the latter bus 441 being the first clock-pulse input of the variable delay unit control circuit 427.

The first inputs of the logic element 539 of the bit location 536, of the logic element 544 of the bit location 541 and of the associated logic elements (not shown) of the bit locations 546–553 of the register 530 are reciprocally coupled to a forward shift command input of the register 530. This forward shift command input is connected to the bus 439 which is connected to the first input of the first pair of reversal signal inputs of the variable delay unit control circuit 427. The first inputs of the logic element 540 of the bit location 536, of the logic element 545 of the bit location 541, and of the associated logic elements (not shown) of the bit locations 546–553 of the register 530 are reciprocally coupled to a backward shift command input of the register 530, connected to the bus 440, the bus 440 being connected to the second input of the first pair of reversal signal inputs of the variable delay unit control circuit 427.

The second input of the logic element 539 is coupled to the bus 573. The second input of the logic element 540 is connected to the bus 565. The second input of the logic element 544 is connected to the bus 564. The second input of the logic element 545 is connected to the bus 566. The couplings of the remaining bit locations 546–553 of the register 530 have the same configuration as the bit locations 536 and 541.

The bus 573 is coupled to the first input of the logic element 534 of the OR gate circuit 533. The second input of the logic element 534 is connected to the bus 439. The output of the logic element 534 is coupled to the first input of the NAND logic element 535, its second input being connected to the output of the logic element 534'. The first input of the logic element 534' is connected to the bus 564 and the second input of the logic element 534' is coupled to the bus 440.

The registers 531 and 532 have a configuration similar to that of the register 530, except that the complementing input of the register 531 is connected to the output of the logic element 535 and while the complementing input of the register 532 is connected to the bus 442 connected to the second clock-pulse input of the variable delay unit control circuit 427. In addition, the backward shift command input of the register 532 is coupled to the bus 437 connected to the first input of the second pair of reversal signal inputs of the variable delay unit control circuit 427, and the forward shift command input of the register 532 is connected to the bus 438 connected to the second input of the second pair of reversal signal inputs of the variable delay unit control circuit 427.

The gate circuit 533' comprises the same elements as the gate circuit 533, the couplings of the gate circuit 533' with the reversible register 532 being similar to those of the gate circuit 533 with the reversible shift register 530. The output of the gate circuit 533' is coupled to the bus 433, the bus 433 being the output of the variable delay unit control circuit 427.

The outputs of the bits (not shown) of the reversible shift registers 531 and 532 are coupled via logic elements, similar to the logic elements 554–563 of the register 530, to the buses 405–424.

The buses 395–424 form a set of terminals of the variable delay unit control circuit 427.

The configurations of the frequency divider 7 (FIG. 1) and the coincidence circuits 30 and 31 are well known to those skilled in the art and therefore are not discussed in the present specification.

The proposed ranging system operates as follows.

Figure 16:
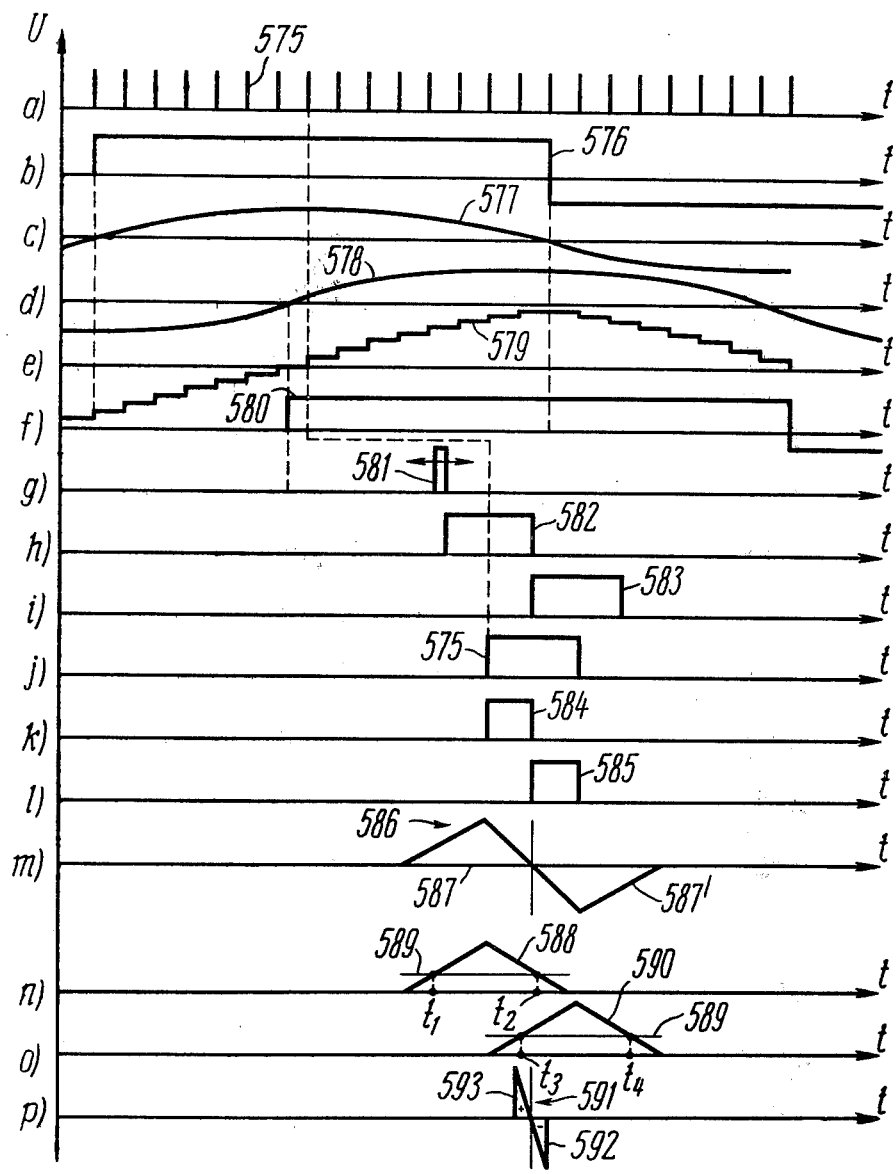
FIGS. 16a–16p are time diagrams illustrating the operation of the ranging system for guiding moving objects over equidistant tracks, according to the invention.

The reference-frequency oscillator 6 (FIG. 1) generates square pulses 575 (FIG. 16a) having, e.g., a duration of 1 microsecond at a frequency of 100 Kc/s. The frequency divider 7 (FIG. 1) divides the frequency of the pulses 575 (FIG. 16a) by 32, thus producing at its output sixteen meander-shaped signals 576 (FIG. 16b). (Meander-shaped signals are rectangular-wave signals whose pulse duration is equal to half their period.) A sine signal 577 (FIG. 16c) is derived in the transmitter 8 of the airborne equipment 2 from the signals 576 of the frequency divider 7 (FIG. 1), the natural high frequency oscillations of the transmitter 8 (FIG. 1) being modulated by said sine signal. The modulated high frequency oscillations are radiated by the airborne aerial 9 and via the transceiving aerial 3 of the ground station 1 are applied to the input of the receiver 4.

A modulation frequency signal is recovered in the receiver 4 of the ground station 1, the natural high frequency oscillations of the transmitter 5 of the ground station 1 being modulated by said modulation frequency signal. The frequency of said high frequency oscillations of the transmitter 5 of the ground station 1 is different from that of the transmitter 8 of the airborne equipment 2.

The modulated high frequency oscillations of the transmitter 5 of the ground station 1 are radiated by the transceiving aerial 3, received by the airborne aerial 9, and applied to the input of the receiver 10 of the airborne equipment 2.

In the receiver 10 a modulation frequency signal 578 (FIG. 16d) is recovered and fed to the first input of the digital filter 11 (FIG. 1). Applied to the second input of the digital filter 11 are the pulses 575 (FIG. 16a) of the reference-frequency oscillator 6 (FIG. 1). The signal 578 (FIG. 16d) is continuously quantized in the digital filter 11 (FIG. 1). An operating frequency of the digital filter 11 is defined by the quantization frequency equal to the repetition rate of the pulses 575 (FIG. 16a) of the reference-frequency oscillator 6 (FIG. 1). A quantized signal 579 (FIG. 16e) is formed in the digital filter 11. The magnitude of attenuation of the digital filter 11 (FIG. 1) is minimal for a signal whose frequency is a multiple of the frequency of the pulses 575 (FIG. 16a) of the reference-frequency oscillator 6 (FIG. 1). At an instant when the quantized signal 579 (FIG. 16e) passes through zero, a reference pulse 580 (FIG. 16f) is generated at the output 20 (FIG. 1) of the digital filter 11, said reference pulse being applied to the first input of the variable delay unit 12 (FIG. 1). The variable delay unit 12 shifts the reference pulse 580 (FIG. 16f) within the period of pulses 575 (FIG. 16a) of the reference frequency oscillator 6 (FIG. 1) according to the signal delivered from the control unit 15 to the second input of said variable delay unit.

The main gating pulse shaper 28 is triggered by the leading edge of a pulse 581 (FIG. 16g) (the time axis is scaled up by 50 for ease of illustration) delivered from the output 21 (FIG. 1) of the variable delay unit 12, the width of the output pulses 582 (FIG. 16h) of the main gating pulse shaper being equal to the width of the pulses 575 (FIG. 16a) of the reference frequency oscillator 6 (FIG. 1).

The main gating pulse 582 (FIG. 16h) passes from the output 34 (FIG. 1) of the main gating pulse shaper 28 to the first input of the coincidence circuit 30 and, from its output 33, to the input of the dependent gating pulse shaper 29 which is triggered by the trailing edge of the main gating pulse 582 (FIG. 16h) and produces a dependent gating pulse 583 (FIG. 16i) with its width equal to the width of the pulses 575 (FIG. 16a) of the reference-frequency oscillator 6 (FIG. 1). The dependent gating pulse 583 (FIG. 16i) is fed to the first input of the coincidence circuit 31 (FIG. 1). Applied to the second inputs of the coincidence circuits 30, 31 are the pulses 575 (FIG. 16a) of the reference-frequency oscillator 6 (FIG. 1), the scale of said pulses along the time axis "t" being increased in FIG. 16j for ease of reading.

Output pulses 584 (FIG. 16k) of the coincidence circuit 30 (FIG. 1), whose width is proportional to the time overlap of the main gating pulse 582 (FIG. 16h) and of the pulse 575 (FIG. 16j) of the reference-frequency oscillator 6 (FIG. 1), are applied to the first input of the differential averaging unit 32. Applied to the second input of the differential averaging unit 32 are output pulses 585 (FIG. 16l) from the coincidence circuit 31 (FIG. 1), the width of said output pulses 585 being proportional to the time overlap of the dependent gating pulse 583 (FIG. 16i) and of the pulse 575 (FIG. 16j) of the reference-frequency oscillator 6 (FIG. 1).

In the differential averaging unit 32 the pulses 584 (FIG. 16k) and 585 (FIG. 16l) delivered, respectively, from the coincidence circuits 30 (FIG. 1), 31 are integrated, statistically processed over two identical channels and subtracted in the operational amplifier (not shown in FIG. 1), whereby the error signal 586 (FIG. 16m) is produced at the output 22 of the differential averaging unit 32, the value of the error signal being proportional to the magnitude of the deviation of the moving object from a prescribed track and its polarity defining the direction of said deviation. It should be understood, however, the magnitude at that point 586 in FIG. 16m shows the error signal change both in magnitude and polarity, as the object moves with respect to the selected track.

When the duration of the output pulses 584 (FIG. 16k) and 585 (FIG. 16l) of the coincidence circuits 30 (FIG. 1) and 31, respectively, are equal, the error signal 586 (FIG. 16m) at the output 22 (FIG. 1) of the averaging differential unit 32 is equal to zero and, therefore, the indicator showing the deviation of the moving object from the selected track indicates zero deviation from the selected track. These output signals are equal only when the first half of the pulse 575 of the reference frequency oscillator 6 coincides with the main gating pulse 582 and the second half of the pulse 575 coincides with the dependent gating pulse 583. This can occur if the pulses of the reference frequency oscillator 6, of the main gating pulse shaper 28, and of the dependent gating pulse shaper 29 are of equal duration and if the leading edge of the dependent gating pulse 583 coincides with the trailing edge of the main gating pulse 582.

Thus, after the pilot gives the command "SEARCH" at one of the command inputs 25 of the control unit 15 (FIG. 1) by pressing the correspondent button 483 (FIG. 13) arranged on the control panel (not shown) in the cockpit of the aircraft, the control unit 15 sequentially switches the taps of the delay lines 370, (FIG. 11) 371 and 372 in the variable delay unit 12 (FIG. 1), whereby the output pulse 581 (FIG. 16g) of the variable delay unit 12 (FIG. 1) is stepped with respect to the reference pulse 580 (FIG. 16f) of the digital filter 11 (FIG. 1). The search is effected until the output pulses 584 (FIG. 16k) and 585 (FIG. 16l) from the coincidence circuits 30 (FIG. 1), 31, respectively, become equal in width, and the error signal 586 (FIG. 16m) at the output 22 (FIG. 1) of the differential averaging unit 32 becomes equal to zero. The zero error signal 586 (FIG. 16m) is a command for the control unit 15 (FIG. 1) to stop the search. A delay is set in the variable delay unit 12, corresponding to zero reading of the deviation indicator 14. This zero reading corresponds to the flight initial track which coincides with the line of equal phase.

When the moving object deviates from the selected track, the phase shift of the modulation frequency signal 578 (FIG. 16d) is caused to increase or decrease with respect to the sine signal 577 (FIG. 16c) modulating the high frequency oscillations of the transmitter 8 (FIG. 1) of the airborne equipment 2. Thus, there occurs a time displacement of the reference pulses 580 (FIG. 16f) relative to the pulses 575 (FIG. 16a) of the reference-frequency oscillator 6 (FIG. 1). With the fixed delay set in the variable delay unit 12 (the search is stopped), a time displacement of the main gating pulse 582 (FIG. 16h) and the dependent gating pulse 583 (FIG. 16i) with respect to the pulse 575 (FIG. 16j) of the reference-frequency oscillator 6 (FIG. 1) is made apparent.

In this case the output pulses 584 (FIG. 16k) and 585 (FIG. 16l) of the coincidence circuits 30 (FIG. 1), 31 are no longer equal, and a positive or negative error signal 587 (FIG. 16) is produced at the output 22 of the differential averaging unit 32, the error signal magnitude being proportional to the amount of the deviation and its polarity defining the direction of said deviation.

The error signal 586 is applied to the control input of the deviation indicator 14 (FIG. 1).

On insertion of the "TRANSFER" command at the other command input 26 of the control unit 15 (FIG. 1) by pressing the other button 528 (FIG. 14) arranged on the control panel (not shown) in the pilot cockpit, a signal is produced in the control unit 15 to change the delay of the reference pulse 580 (FIG. 16f) in the variable delay unit 12 (FIG. 1) according to the magnitudes set up in the track-to-track distance switches 502 (FIG. 14) and 503. The magnitude of the delay change is proportional to the distance between the initial and the subsequent selected tracks.

When the ranging system is brought into operation, a negative d.c. voltage is applied across the bus 61 (FIG. 2) and normally closed contacts 70 and 66 of the relay 48 to the winding of the relay 47. The relay 47 is operated, its change-over contact 76 closures the normally open contact 78, and the error signal 586 (FIG. 16m) is prevented from passing from the control input 77 (FIG. 2) of the deviation indicator 14 to the inputs of the amplifiers 37 and 38.

In the absence of the pulses 584 (FIG. 16k) from the coincidence circuit 30 (FIG. 1) at the command input 54 of the deviation indicator 14, the field-effect transistor 43 (FIG. 2) is conductive and hence the transistor 45 is cut-off. The current does not flow across the winding of the relay 48, and its contacts 70 and 66 are closed. When time displacement of the main gating pulse 582 (FIG. 16h) takes place at the output 50 (FIG. 2) of the integrating circuit formed by the combination of the resistor 51, the diode 52, and the capacitor 53, a signal is generated, whose variation resulting from the deviation of the moving object from the selected track is shown as 588 (FIG. 16n).

As the signal 588 at the output 50 (FIG. 2) of the integrating circuit at an instant $t_1$ reaches its threshold 589 (FIG. 16n), the field-effect transistor 43 (FIG. 2) is cut-off, resulting in a current jump through the transistor 45 and the winding of the relay 48.

The contact 70 of the relay 48 closures the contact 68. The indicator light 42 is switched on. Such a condition is maintained until an instant $t_2$ (FIG. 16n), when the signal 588 at the output 50 of the integrating circuit reaches a lower value as compared to the threshold 589 (FIG. 16n). The contacts 70 (FIG. 2) and 68 of the relay 48 are then opened.

The pulses 585 (FIG. 16l) are fed to the second command input 55 from the coincidence circuit 31 (FIG. 1). The operation of an integrating circuit comprising the resistor 56 (FIG. 2), the diode 57 and the capacitor 58, of the field-effect transistor 44, of the transistor 46 and of the relay 49 is identical to that described hereinbefore. At the point 59 a signal is produced, its variation, resulting from the deviation of the moving object from the selected track, being shown as 590 (FIG. 16o).

The response time instant $t_3$ of the transistor 44 (FIG. 2), however, is displaced with respect to the instant $t_1$ (FIG. 16n) by the width of the pulses 575 (FIG. 16j) of the reference-frequency oscillator 6 (FIG. 1), since the dependent gating pulse 583 (FIG. 16i) is displaced by this amount relative to the main gating pulse 582 (FIG. 16h).

The threshold values 589 (FIG. 16n) for the field-effect transistors 43 (FIG. 2) and 44 are chosen to be equal.

No negative voltage is applied to the winding of the relay 47 (FIG. 2) from the bus 61 within the period between $t_3$ (FIG. 16o) and $t_2$ (FIG. 16n), since the contacts 66 and 70 of the relay 48 and the contacts 67 and 71 of the relay 49 are open. The contacts 76 and 75 of the relay 47 are closed, which results in applying an error signal 591 (FIG. 16p) to the resistors 74 and 94.

The error signal 591 (FIG. 16p) is amplified and inverted by the amplifier 72 (FIG. 2) and then applied, via the resistor 86 (FIG. 2), to the base of the transistor 73. The positive potential enables a current to flow through the transitor 73 (the transistor 73 is conducting) and so the gas-discharge indicator 39 lights up. The length of the illuminated portion of the gas-discharge indicator 39 is proportional to the current through the transistor 73. When a zero or negative potential is across the base of the transistor 73, the indicator 39 does not light up. This mode of circuit operation is controlled by the potentiometer 80 and the resistor 86.

The right-hand discharge indicator 39, therefore, responds to a change in the negative value 592 (FIG. 16p) of the error signal 591 shaped by the error signal input control circuit 36 (FIG. 2). The operation of the amplifier 38 is similar to that described hereinabove, except that the error signal 591 (FIG. 16p) is previously made to pass an inverting stage based on the unity-gain operational amplifier 91 (FIG. 2). Thus, the left-hand gas-discharge indicator 40 responds to a change in the positive value 593 (FIG. 16p) of the error signal 591.

Figure 17:
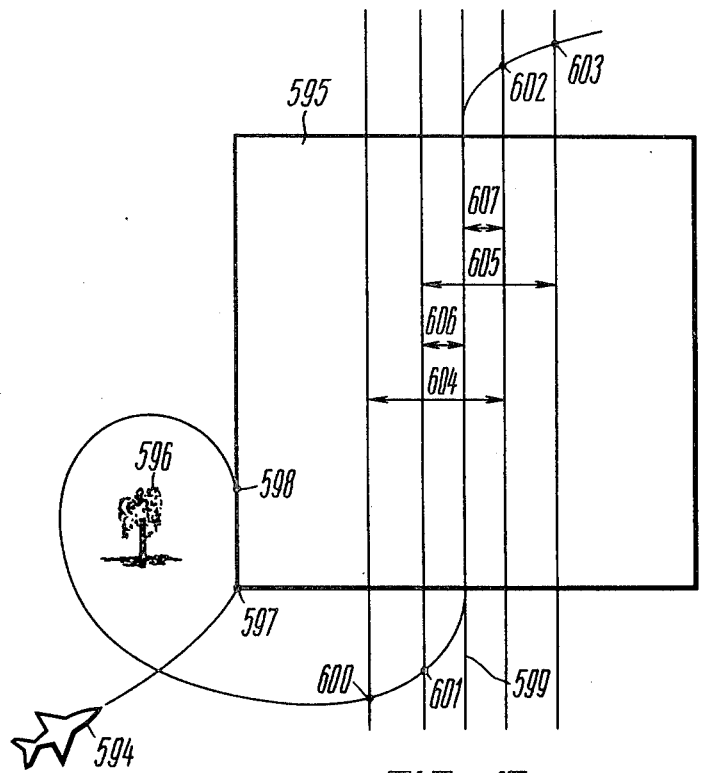
FIG. 17 shows an object moving along equidistant tracks to illustrate the operation of the deviation indicator, according to the invention.

The principle of aircraft guidance by means of the deviation indicator 14 indicating the deviation of the moving objects from a prescribed track (FIG. 1) is as follows. Once the required distance between the equally spaced tracks is set on the ground control unit 15 by adjusting the switches 502 (FIG. 14) and 503, the pilot steers the aircraft 594 (FIG. 17) to the outer boundary of the parcel 595 to be treated by observing landmarks 596 and used conventional navigation instruments (not shown). On giving the "SEARCH" command at point 597, the pilot maintains the flight along the boundary of the parcel 595 for 0.1 to 0.5 s. During the interval the control unit 15 (FIG. 1) provides the search mode of operation followed by illumination of the indicator lights 41 (FIG. 3) and 42, but the indicators 39, 40 are not illuminated. When the "TRANSFER" command is given at a point 598 (FIG. 17), the pilot starts steering the aircraft 593 to the selected track 599. Neither the indicator lights 41 (FIG. 3), 42, nor the indicators 39 and 40 are illuminated. As the selected track 599 (FIG. 17) is approached at a point 600 which corresponds to the instant $t_1$ (FIG. 16n), the indicator light 41 (FIG. 3) is turned on, and at a point 601 (FIG. 17) corresponding to the instant $t_3$ (FIG. 16o) the indicator light 42 (FIG. 3) is turned on accompanied by full illumination of the indicator 39. With further decrease of the distance between the aircraft 623 (FIG. 17) and the selected track 599, the length of the illuminated portion of the gas-discharge indicator 39 (FIG. 3) is reduced and only the indicator lights 41 (FIG. 3) 42 are on, while the vehicle is running along the selected track 599 (FIG. 17). As the aircraft 594 (FIG. 17) moves away from the track 599 on the other side, the length of the illuminated portion of the indicator 40 (FIG. 3) starts increasing, and when a point 602 (FIG. 17) is reached, which corresponds to the instant $t_2$ (FIG. 16p), the indicator 40 (FIG. 3) flares up. As the aircraft 594 (FIG. 17) keeps moving off the track 599, both the indicator 40 (FIG. 3) and the indicator light 41 are extinguished, and only the indicator light 42 is left on. At a point 603 (FIG. 17) corresponding to the instant $t_4$ (FIG. 16o) the lights are completely out.

Thus the indicator light 41 (FIG. 3) is operative on the section 604 (FIG. 17), the indicator light 42 (FIG. 3) on the section 605 (FIG. 17), the indicator 39 (FIG. 3) on the section 606 (FIG. 17), and the indicator 40 (FIG. 3) on the section 607 (FIG. 17).

As previously stated, when the aircraft 594 (FIG. 17) is running exactly along the selected track 599, the indicator lights 41 (FIG. 3) and 42 are both turned on. As the aircraft 594 (FIG. 17) deviates to the left of the selected track 599, the indicator 39 (FIG. 3) mounted on the right hand lights up. In this way the pilot is advised of the necessity to shift the control (not shown) right. If the aircraft 594 (FIG. 17) deviates to the right of the selected track 599, it is the indicator 40 (FIG. 3) mounted on the left that lights up. The control (not shown) is then to be turned left.

A modulation frequency signal at 3.125 kHz is fed from the output of the receiver 4 to the input 140 (FIG. 4) of the transmitter 5 (FIG. 1) of the ground station 1. A resonant filter formed by the capacitor 139 (FIG. 4) and the inductor 138 provides a better signal-to-noise ratio at the output of the receiver 4 (FIG. 1). The output from the secondary winding of the inductor 138 (FIG. 4) is applied to the gate of the field-effect transistor 133 which controls the negative feedback ratio of the transistor 130 and, consequently, the gain of the modulator 116. The driving oscillator 114 generates high-frequency oscillations applied to the base of the transistor 130 and amplified by the modulator 116 with its gain following the modulation frequency signal law. The advantages of such a circuit arrangement of the modulator 116 are its transfer function linearity and a high impedance of the transmitter modulation input 140.

The modulated high frequency output of the modulator 116 is amplified by the driver 117, whose stages constructed with the transistors 146, 149 and 156 have a linear transfer function, and finally by the push-pull power amplifier 118 operated as a class B amplifier with a cut-off angle near 90°.

The operation principle of the transmitter 8 (FIG. 1) of the airborne equipment 2 is similar to that of the transmitter 5. The transmitter 8, however, has a different H.F. oscillation frequency. A meander-shaped signal at 3.125 kHz is applied to the input 140 (FIG. 4) of the transmitter 8 (FIG. 1) of the airborne equipment 2 from the frequency divider 7. The resonant filter discriminates a sine-wave modulation signal. The modulation frequency signal is phase-locked by the pulses of the reference-frequency oscillator 6. The transmitter circuit 8 of the airborne equipment 2 is otherwise functionally identical to the transmitter circuit 5 of the ground station 1.

A modulated H.F. signal is applied to the input 178 (FIG. 5) of the receiver 10 (FIG. 1) of the airborne equipment 2. The band-pass filter 175 (FIG. 5) provides a 100 to 120 dB voltage attenuation in the frequency channel of the transmitter 8 (FIG. 1) using four sections 184 (FIG. 5), 185, 186 and 187.

The output 190 of the band-pass filter 175 drives the driver 176 comprising two stages of resonant amplifiers employing the transistors 192 and 196 with parallel circuits (capacitor 200 and inductor 199, and capacitor 215 and inductor 216) in the collector path, and with series circuits (capacitor 203 and inductor 202, and capacitor 210 and inductor 211) in the emitter path, and isolated by emitter followers built around the transistors 196 and 212. The amplified output of the driver 176 is applied to the resonant circuit of the final amplifier 177 composed of the capacitors 218 and 219 and the inductor 220. Complementary symmetry emitter followers using the transistors 223 and 224 of different conductivity types ensure an additional discrimination of adjacent channels. The amplified H.F. signal through a series filter consisting of the inductor 229 and capacitor 230 is applied to the input of an amplitude detector employing the diodes 231 and 232, with a low-pass filter formed by the inductor 233 and the capacitor 234. A modulation frequency signal is derived from the H.F. modulated signal at the output 19 of the receiver.

An automatic gain control (AGC) circuit, including an AGC-detector based on the diode 235, and an AGC-amplifier, based on the transistors 238 and 239, provide a receiver input varying dynamic range as large as 40 to 50 dB, while keeping the required stability of the transfer function phase characteristic of the receiver amplifying path. The gain control is effected in the driver 176 by adjusting the power supply voltage to the bus 195.

The modulation frequency output 19 (FIG. 1) of the receiver 10 in the airborne equipment 2 drives the input 355 (FIG. 10) of the digital filter and via the operational amplifier 357, the capacitor 354, and the resistor 353, is applied to the capacitors 336-351.

Applied to the input 303 of the digital filter are pulses of the reference-frequency oscillator 6 (FIG. 1). The divider 293 (FIG. 10) performs frequency division of the pulses from the reference-frequency oscillator 6 (FIG. 1). The operating frequency of the digital filter is determined by the change-over frequency of the flip-flop 299.

The decoder 294 distributes the outputs of the flip-flops 299, 300, 301 and 302 to sixteen channels, thereby defining sixteen equal time slots within the modulation frequency signal period. Consequently, each of the logic elements 320-335 is enabled, sequentially in time, for the 1/16 th part of the modulation frequency signal input period, and the capacitors 336-351 are sequentially charged from the output of the operational amplifier 357.

At resonance, i.e. with the input signal frequency being a multiple of the pulse repetition rate of the reference-frequency oscillator 6 (FIG. 1), a balanced charge is stored by each of the capacitors 336-351 (FIG. 10) causing the minimum current to flow through the resistor 353.

If the frequency at the input 355 is not a multiple of the pulse repetition rate of the reference-frequency oscillator 6 (FIG. 1), each switching time for any of the capacitors 336-351 (FIG. 10) corresponds to random non-repetitive values of the input signal. This implies that while the one capacitor selected by the decoder 294 is being charged by the input signal, the ohter fifteen capacitors may discharge through the emitter-base junctions of the transistors in the logic elements 320-335, or vice versa. A high current then flows through the resistor 353, resulting in a sudden drop of the signal level at the bus 352. At resonance, the signal across the bus 352 will be at its maximum, since the charge of the capacitors 336-351 has no period-to-period variations.

The signal from the bus 352 is applied, via the resistor 361, to the inverting input of the operational amplifier 360 with the diodes 362, 363, 364 and 365 connected in the feedback circuit thereof. The logarithmic voltage-current characteristic of said diodes ensures a specific non-linearity of the transfer function of the limiting amplifier 297, as shown above. Consequently, the limiting amplifier 297 responds to small positive and negative deviations of the input signal from a predetermined level to produce a reference pulse 580 (FIG. 16f) at the output 20 of the digital filter synchronously with the transition of this level.

The reference pulse 580 is applied to the input 385 (FIG. 11) of the variable delay unit. A positive-polarity pulse is generated by the leading edge of the reference pulse 580 (FIG. 16f) in the shaper 373, the shaped pulse driving the input of the delay line 370 (FIG. 11) and the input of the flip-flop circuit based on the tunnel diode 379, which is in one of its stable states, and causing the circuit to change state. The output pulse of the shaper 373 is passed through the delay line 370 and reflected from one of its taps shunted across one of the buses 395-404 and the variable delay unit control circuit 427 (FIG. 12) to the zero bus. The delay line 370 provides a delay of the reference pulse 580 (FIG. 16f) of within 1μs in discrete steps of 0.1μs. A negative-polarity pulse reflected from the shunted tap drives the flip-flop circuit constructed with the tunnel diode 379 (FIG. 11)

and resets the circuit. The shaper 374 is triggered by the trailing edge of the pulse fed from said flip-flop circuit. The delay line 371 provides a delay for the output pulse of the shaper 374 of, for example, within 10 us in discrete steps of 1μs. The delay line 372 provides a delay for the output pulse of the shaper 375 of; for example 0.1μs in discrete steps of 0.01 μs. Thus, by stepping the taps of the delay lines 370, 371 and 372 it is possible to shift the pulse 581 (FIG. 16g) at the output 21 (FIG. 11) of the variable delay unit within 10μs in 0.01 μs steps.

With no pulses 581 (FIG. 16g) present at the main gating pulse shaper input (FIG. 6), a low level signal will appear at the output of the logic element 243 and a high level at the output of the logic element 244, thus causing the capacitor 249 to remain in a discharged state. The positive-polarity pulse 581 (FIG. 16g) passing the inverting stage with the logic element 242 (FIG. 6) sets a high level at the output of the logic element 243, charging the timesetting capacitor 249. When the voltage across the capacitor 249 reaches the operation threshold of the logic element 245, the circuit is reset, i.e. a low level is produced at the output of the logic element 243, while a high level appears at the output of the logic element 244. The potential change is transmitted from the output of the logic element 244 through the inverting stages including the logic elements 246 and 247 to produce the main gating puls 582 (FIG. 16h) at the outputs 33 and 34.

The dependent gating pulse shaper 29 (FIG. 7) is functionally similar to the above.

The signals 584 (FIG. 16k) and 585 (FIG. 16l) from the coincidence circuits 30 (FIG. 1) and 31 are applied, respectively, to the inputs 268 (FIG. 8) and 269 of the differential averaging unit 32. Two input integrating circuits, one of which is formed by the resistor 260, the diode 261, the capacitor 262, and the resistor 263, and the other circuit consisting of the resistor 270, the diode 271, the capacitor 272 and the resistor 273, have short charge time constants and long discharge time constants under control of the resistors 263 and 273, respectively. These input integrating circuits perform three basic operations of statistical signal processing, namely, converting, adding, and averaging. As a result, signals are produced at the outputs 267 and 276 of the input integrating circuits, whose variations due to the moving object deviation from the selected track are shown at 588 (FIG. 16n), 590 (FIG. 16o). These signals arrive at the two inputs of the operational amplifier 258 (FIG. 8), and at its output 22 and error signal is derived, its variation due to the moving object deviating from the selected track being indicated at 586 (FIG. 16m).

When the "SEARCH" command is given by pressing the command button 478 (FIG. 13), the bus 429 is connected to the zero bus 469. At the outputs of the first bit location 536 (FIG. 15) of the first reversible register 530 and at the outputs of th first bit location (not shown) of the variable delay control unit registers 531 and 532, a high level is set (logical "1"), while at the outputs of the remaining bit locations of the registers 530, 531 532 a low level is set (logical "0"), which corresponds to the initial state of said registers. With the output of the logic element 554 set low, the tap of the delay line 370 (FIG. 11) coupled to the bus 395 comes to be connected, via the conducting output transistor (not shown) of the logic element 554 (FIG. 15) to the zero bus (not shown). The bus 405 of the delay line 371 (FIG. 11) and the bus 415 of the delay line 372 are likewise connected to the zero bus in the variable delay control circuit.

On pressing the button 478 (FIG. 13) and the flip-flops 466, 465 are reset enabling the logic elements 458 and 460 to pass the clock pulses fed from the clock 485 (FIG. 14) over the bus 436 via the logic element 462 (FIG. 13) to the bus 441. As the clock pulses arrive at the bus 441, the logical "1" in the register 530 (FIG. 15) is shifted right, sequentially connecting the buses 396 and 397–404 to the zero bus (not shown) with an "enable", i.e. high, level on the bus 439, or else it is shifted left, sequentially connecting the buses 404, 403–396 to the zero bus (not shown) with an "enable" level on the bus 440. The enable condition of the buses 439 and 440 is dependent on the setting of the switch 445 (FIG. 13). The tap switching of the delay line 370 (FIG. 11) leads to displacement of the reflected pulse 581 (FIG. 16g) relative to the reference pulse 580 (FIG. 16f) within 1 μs.

The logical "1" from the output of the bit location 553 (FIGZ. 15) (enable signal on the bus 439) via the logic elements 534 and 535, or from the output of the bit location 536 (enable signal on the bus 440) via the logic elements 534, 535, is applied to the input of the reversible register 531, the register 530 being reset. In the reversible register 531, the logical "1" connects, in the above described manner, the bus 406 or 414 to the zero bus (not shown), according to the enable signal being available on the bus 439 or 440, respectively. As previously stated, the discrete step of the delay line 371 (FIG. 11) is equal to th total delay time of the line 370 and amounts to 1 μs.

The clock pulses delivered from the bus 441 (FIG. 15) keep on switching the buses 395–404. The tapes of the delay lines 370 (FIG. 11), 371 are switched until the polarity of the signal 586 (FIG. 16m) applied to the input 428 (FIG. 13) is reversed. The flip-flop 465 driven by the output of the operational amplifier 443, via the logic element 446, then changes state causing a clock inhibit signal to be applied to the logic element 460, thus inhibiting the clock pulses through the logic element 462 to the bus 441.

At the same time, the output of the operational amplifier 443, via the capacitor 475 and the logic elements 447 and 448, changes the state of the flip-flop 464 to deliver an enable signal to the input of the logic element 459, enabling the clock pulses to pass from the output of the logic element 458 via the logic elements 459, 463 on to the bus 442. The same enable signal is applied to the input of the logic element 461. The clock pulses on the bus 442 provide for a logical "1" shift in the register 532 (FIG. 15) in a manner similar to that employed in the registers 530 and 531. The shift direction of the logical "1" in the register 532 is controlled by the setting of the switch 444 (FIG. 13) and is invariably opposite to the shift of the logical "1" in the registers 530 (FIG. 15) and 531. The logic "1" shift in the register 532 (FIG. 15) provides for the tap switching of the delay line 372 (FIG. 11) in discrete steps of 0.01 μs. As a result of the oppositely directed tap switching of the delay line 372, the polarity of the error signal 586 (FIG. 16m) at the input 428 (FIG. 13) is reversed and, as shown above, the flip-flop 464 changes its state and delivers a signal to the input of the logic element 459 to inhibit the clock pulses to the bus 442. The logical "1" shift in the register 532 (FIG. 15) is stopped to indicate the end of searching the initial flight track.

If the overflow of the register 532 does not entail a polarity reversal of the error signal 586 (FIG. 16m), the logical "1" from the output of the gate circuit 533'

(FIG. 15), via the bus 433 and the logic elements 461 (FIG. 13), 462, is applied to the bus 441. A one-bit shift of the logical "1" in the register 530 (FIG. 15) is produced by the pulse taken from the bus 441.

This control unit circuit ensures an initial setting of the deviation indicators 39, 40 (FIG. 3) to within 1.5 m (0.01 μs).

When the "TRANSFER" command is given by pressing the button 528 (FIG. 14), the bus 432 is connected to the zero bus 526. The JK-flip-flop 497, the D-flip-flops 508–513 of the register 486, the D-flip-flops 500 and 501, and the flip-flop 498 are reset. At the same time, a signal is delivered by the flip-flop 499 to the logic element 487, enabling the clock pulses to pass from the output of the clock 485 to the C-input of the JK-flip-flop 497. The pulses from the direct output of the JK-flip-flop 497 are applied via the logic elements 490, 489 and 488 to the bus 434, and via the logic element 462 (FIG. 13) to the bus 441. The pulses from the inverted output of the JK-flip-flop 497 (FIG. 14) are applied to the C-inputs of the flip-flops 508–513 of the register 486. The output of one of the flip-flops 509–513, by way of one of the contacts of the track-to-track distance switch 502 coupled to the change-over contact 524 of the same, is applied through the logic element 491 to the R-input of the flip-flop 498. The flip-flop 498 changes state and inhibits the pulses through the logic element 490. Thus the number of pulses on the bus 434 and, consequently, on the bus 441 (FIG. 15) is determined by the setting of the track-to-track-distance switch 502 (FIG. 14).

Figure 15:
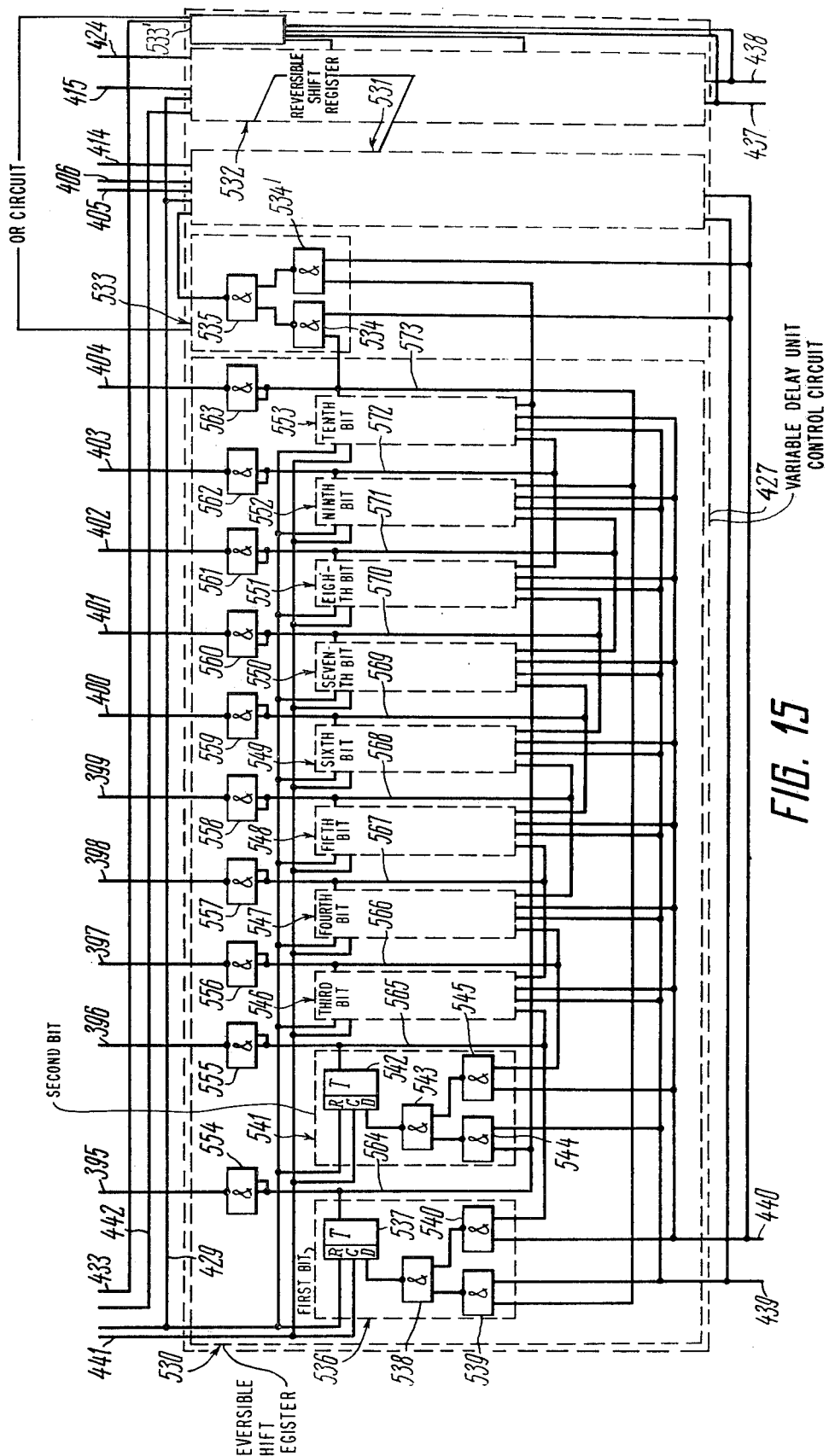
FIG. 15 is a block diagram of a variable delay unit control circuit, according to the invention.

The pulses from the bus 441 (FIG. 15) are applied to the register 530 and provide the tap switching of the delay lines 370 (FIG. 11) and 371 from the initial position predetermined in the search mode as shown above. The number of the switched taps of said delay lines is then determined by the number of the clock pulses delivered to the bus 441 (FIG. 15). The direction of this switching is dependent on the setting of the switch 445 (FIG. 13).

The clock pulses from the output of the logic element 487 (FIG. 14) are also applied via the logic element 492 to the input of the logic element 494. The clock pulses are transferred from the output of the logic element 494 along the bus 435 via the logic element 463 (FIG. 13) to the bus 442. The output of one of the flip-flops 509–513 (FIG. 14) of the register 486 is applied, by way of one of the contacts of the track-to-track distance switch 503 coupled to the change-over contact 525 of this switch, via the logic elements and 496 495, to the C-input of the flip-flop 500 causing the flip-flop to change state. The output of the flip-flop 500 inhibits the pulses to the bus 435 via the logic element 494. Thus the number of clock pulses on the bus 435 and, consequently, on the bus 442 (FIG. 15) is governed by the setting of the track-to-track distance switch 503.

The pulses from the bus 442 (FIG. 15) are applied to the register 532 and ensure the tap switching of the delay line 372 (FIG. 11) from its initial position preset in the search mode as shown above. The number of switched taps of said delay line is determined by the number of clock pulses on the bus 442 (FIG. 15). The direction of switching is dependent on the setting of the switch 444 (FIG 13).

In case of the overflow of the register 532 (FIG. 15), the logical "1" from the output of its last stage (not shown) is applied via the bus 433 to the C-input of the D-flip-flop 501 (FIG. 14) which delivers to the input of the logic element 493 a signal enabling one clock pulse to the input of the logic element 489. So one clock pulse appears on the bus 441 (FIG. 15), shifting the logical "1" in the register 530 by one bit.

The proposed ranging system supplies an operator with data on the deviation of the moving object from the selected track with an accuracy of within ±1 m. The indicating device used in said ranging system allows a reduction of the time required to interpret the data on the moving object position relative to the selected track from to 0.1 to 0.3 s, thus maintaining the moving object on the selected track with an accuracy of within 1 m. The proposed system features additional advantages, including its reliable operation with the signal-to-noise ratio at the airborne receiver output being equal to 10, in severe radio interference environment.

Although the preferred embodiment of the present invention is fully disclosed and illustrated with the accompanying drawings, it will be understood that numerous modifications and other embodiments of the invention may be devised without departing from the spirit and scope thereof, defined by the following claims.

What is claimed is:

1. A ranging system for guiding moving objects over equidistant tracks, comprising a ground station and airborne equipment;

wherein said ground station comprises:
a transceiving aerial;
a receiver having an input connected to said transceiving aerial and an output; and
a transmitter having an input connected to said output of said transceiving aerial and an output connected to said transceiving aerial; and wherein said airborne equipment comprises:
a reference-frequency oscillator having an output;
a frequency divider, for obtaining meander-shaped signals or modulation frequency, havin an input connected to said output of said reference-frequency oscillator and an output;
a transmitter having an input connected to said output of said frequency divider and an output;
an airborne aerial connected to said output of said transmitter;
a receiver having an input connected to said airborne aerial and an output;
a digital filter, for producing a reference pulse when a modulation frequency signal derived from an output signal of said receiver passes through zero, having a first input connected to said output of said receiver, a second input connected to said output of said reference-frequency oscillator, and an output;
a variable delay unit, to shift said reference pulse within the pulse period of said reference-frequency oscillator, having a first input connected to said output of said digital filter, a second input and an output;
a processing unit, for statistical processing of reliable signals to produce an error signal proportional to the deviation of the moving object from a prescribed track, the polarity of said error signal defining the direction of said deviation, having a first input connected to said output of said variable delay unit, a second input connected to said output of said reference-frequency oscillator, an error signal output and first and second command outputs;

a deviation indictor, for indicating the deviation of the moving object from a prescribed track, having a control input connected to said error signal output of said processing unit, and first and second command inputs connected to said first and second command outputs of said processing unit, respectively; and a control unit, to control the shift magnitude of said reference pulse in said variable delay unit, having two command inputs for manual input of commands, as input connected to said error signal output of said processing unit, and an output connected to said second input of said variable delay unit.

2. A ranging system according to claim 1, wherein said processing unit comprises:

a main gating pulse shaper, for discriminating a main gating pulse from the pulse of said variable delay unit, having an input connected to said first input of said processing unit, a first output and a second output;

a dependent gating pulse shaper, for producing a dependent gating pulse triggered by the trailing edge of said main gating pulse, having an output and an input connected to said first output of said main gating pulse shaper;

first and second coincidence circuits, for obtaining pulses, the width thereof being proportional to the time overlap of the pulses of said reference-frequency oscillator and of said main and dependent gating pulses, having a first input, said first input of said first coincidence circuit being connected to said second output of said main gating pulse shaper and said first input of said second coincidence circuit being connected to said output of said dependent gating pulse shaper, a second input connected to said second input of said processing unit, and an output, said outputs of said first and second coincidence circuits being connected to said first and second command outputs of said processing unit, respectively; and a differential averaging unit, for obtaining an error signal whose value is proportional to the width difference of the pulses of said coincidence circuits, having a first input connected to said output of said first coincidence circuit, a second input connected to said output of said second coincidence circuit, and an output connected to said error signal output of said processing unit.

3. A ranging system according to claim 1, wherein said control unit comprises a zero-finding circuit, a track change-over circuit and a variable delay unit control circuit; wherein said zero-finding circuit indicates an initial equidistant track on the deviation indicator, and includes a first input connected to said first input of said control unit, a second input connected to said first command input of said control unit, a third input, first, second and third clock pulse inputs, first and second pairs of reversal signal outputs and first and second clock pulse outputs, said third input and said first clock pulse input being operatively associated with said first clock pulse output of said zero-finding circuit, said second clock pulse input being operatively associated with said second clock pulse output of said zero-finding circuit, said zero-finding circuit comprising:

an operational amplifier responsive to passage of said error signal through zero and providing an operative coupling of said third clock pulse input of said zero-finding circuit with said first clock pulse output of said zero-finding circuit within the interval between the input of the command transfer to said second input of said zero-finding circuit and the passage through zero of said error signal, and an operative coupling with said second clock pulse output of said zero-finding circuit within the interval between the first and second passages through zero of said error signal, said operational amplifier having an input connected to said first input of said zero-finding circuit and an output operatively associated with said first and second clock pulse outputs of said zero-finding circuit;

first and second switches, to reverse the direction of a reference pulse shift in said variable delay unit, said first and second contacts of said first switch being operatively associated with the first and second outputs, respectively, of said first pair of reversal signal outputs of said zero-finding circuit, said first and second contacts of said second switch being operatively associated with the first and second outputs, respectively, of said second pair of reversal signal outputs of said zero-finding circuit, said change-over contacts of said switches being mechanically interconnected; wherein said track change-over circuit indicates subsequent equidistant tracks on the deivation indicator and has a first input connected to said second command input of said control unit, a second input operatively associated with a first output of said track change-over circuit and said first output and second and third outputs connected, respectively, to said first, second and third clock pulse inputs of said zero-finding circuit, said selected track transfer circuit comprising:

a clock having an output operatively associated with said first and second outputs of said track change-over circuit and connected to said third output of said track change-over circuit;

a register having an input operatively associated with said output of said clock and bit outputs;

two track-to-track distance switches, for counting clock pulses at said first and second outputs of said track change-over circuit, having a change-over contact and contacts equal in number to said bit outputs of said register, each of said contacts being connected to one of said bit outputs of said register, said change-over contacts of said first and second track-to-track distance switches being operatively associated with said first and second outputs of said track change-over circuit, respectively; and wherein said variable delay unit control circuit sets the magnitude of reference pulse delay in said variable delay unit, and has an input connected to said first command input of said control unit, first and second inputs of a first pair of reversal signal inputs connected to said first and second outputs of said first pair of reversal signal inputs of said zero-finding circuit, respectively, first and second inputs of a second pair of reversal signal inputs connected to said first and second outputs of said second pair of reversal signal outputs of said zero-finding circuit, respectively, first and second clock pulse inputs connected to said first and second clock pulse outputs of said zero-finding circuit, respectively a first output connected to said second input of said track change-over circuit and to said third input of said zero-finding circuit and a group of outputs connected to said output of said control unit, said variable delay unit control circuit comprising:

first, second and third reversible shift registers having a complementing input, a reset input, a forward shift command input, a backward shift command input and outputs equal in number to said register bits, said complementing input of said first reversible shift register being connected to said first clock pulse input of said variable delay unit control circuit, said reset input of each of said reversible shift registers being connected to said first input of said variable delay unit control circuit, said forward shift command inputs of said first and second reversible shift registers being connected to said first input of said second pair of reversal signal inputs of said variable delay unit control circuit, said backward shift command inputs of said first and second reversible shift registers being connected to said second input of said second pair of the reversal signal inputs of said variable delay unit control circuit, said complementing input of said second reversible shift register being operatively associated with outputs of first and last bits of said first reversible shift register, said complementing input of said third reversible shift register being connected to said second clock pulse input of said variable delay unit control circuit, said forward shift command input of said third reversible shift register being conneced to said second input of said first pair of reversal signal inputs of said variable delay unit control circuit, said backward shift command input of said third reversible shift register being connected to said first input of said first pair of reversal signal inputs of said variable delay unit control circuit, each of said outputs of each of said reversible shift registers being operatively associated with a respective output of said group of outputs of said variable delay unit control circuit, said first output of said variable delay unit control circuit being operatively associated with outputs of first and last bits of said third reversible shift register.

4. A ranging sysem according to claim 2, wherein said deviation indicator comprises two warning indicators, for indicating a moving object position with respect to the prescribed track, and two linear indicators, for evaluating the magnitude of the deviation of the moving object from the prescribed track, each of said warning indicators being operatively associated with a respective command input of said deviation indicator, said linear indicators being aligned with their glow start points adjacent and being operatively associated with said control input of said deviation indicator.

5. A ranging system according to claim 1, wherein said deviation indicator comprises two warning indicators, for indicating the moving object position relative to the prescribed track, and two linear indicators, for evaluating the magnitude of the moving object deviation from the track, each of said warning indicators being operatively associated with a respective command input of said deviation indicator, said linear indicators being aligned with their glow start points adjacent to and being operatively associated with said control input of said deviation indicator.

6. A ranging system according to claim 1, wherein said transmitter of said ground station and said transmitter of said airborne equipment each comprises a modulator incorporating a transistor with a negative feedback loop, a field-effect transistor connected into said negative feedback loop of said transistor, and a capacitor connected into said negative feedback loop of said transistor and connected in series with said field-effect transistor.

7. A ranging system according to claim 2, wherein said differential averaging unit comprises:

two input integrating circuits, for averaging pulses from said outputs of said coincidence circuits, having an input connected to a respective input of said differential averaging unit and an output;

an operational amplifier having inputs connected to said output of a respective input integration circuit and an output connected to said error signal output of said processing unit; and wherein each of said input integrating circuits incorporates a series connection of a first resistor, a diode and a capacitor, and a second resistor placed between one of said inputs of said operational amplifier and a junction point of said diode and said capacitor.

8. A ranging system according to claim 4, wherein said control unit comprises a zero-finding circuit, a track change-over circuit and a variable delay unit control circuit; wherein said zero-finding circuit indicates an initial equidistant track on said deviation indicator, and includes a first input connected to said first input of said control unit, a second input connected to said first command input of said control unit, a third input, first, second and third clock pulse inputs, first and second pairs of reversal signal outputs and first and second clock pulse outputs, said third input and said first clock pulse input being operatively associated with said first clock pulse output of said zero-finding circuit, said second clock pulse input being operatively associated with said second clock pulse output of said zero-finding circuit, said zero-finding circuit comprising:

an operational amplifier responsive to passage of said error signal through zero and providing an operative coupling of said third clock pulse input of said zero-finding circuit with said first clock pulse output of said zero-finding circuit within the interval between the input of the command transfer to said second input of said zero-finding circuit and the passage through zero of said error signal, and an operative coupling with said second clock pulse output of said zero-finding circuit within the interval between the first and second passages through zero of said error signal, said operational amplifier having an input connected to said first input of said zero-finding circuit and an output operatively associated with said first and second clock pulse outputs of said zero-finding circuit;

first and second switches, to reverse the direction of a reference pulse shift in said variable delay unit, first and second contacts of said first switch being operatively associated with the first and second outputs, respectively, of said first pair of reversal signal outputs of said zero-finding circuit, first and second contacts of said second switch being operatively associated with the first and second outputs, respectively, of said second pair of reversal signal outputs of said zero-finding circuit, change-over contacts of said switches being mechanically interconnected; wherein said track change-over circuit indicates subsequent equidistant tracks on the deviation indicator and has a first input connected to said second command input of said control unit, a second input operatively associated with a first output of said track change-over circuit, and said first output and second and third outputs connected, respectively, to said first, second and third clock pulse inputs of said zero-finding circuit, said track transfer circuit comprising:

a clock having an output operatively associated with said first and second outputs of said track change-over circuit and connected to said third output of said track change-over circuit;

a register having an input operatively associated with said output of said clock and bit outputs;

two track-to-track distance switches, for counting clock pulses at said first and second outputs of said track change-over circuit, having a change-over contact and contacts equal in number to said bit outputs of said register, each of said contacts being connected to one of said bit outputs of said register, said change-over contacts of said first and second track-to-track distance switches being operatively associated with said first and second outputs of said track change-over circuit, respectively; and wherein said variable delay unit control circuit sets the magnitude of reference pulse delay in said variable delay unit, and has an input connected to said first command input of said control unit, first and second inputs of a first pair of reversal signal inputs connected to said first and second outputs of said first pair of reversal signal inputs of said zero-finding circuit, respectively, first and second inputs of a second pair of reversal signal inputs connected to said first and second outputs of said second pair of reversal signal outputs of said zero-finding circuit, respectively, first and second clock pulse inputs connected to said first and second clock pulse outputs of said zero-finding circuit, respectively, a first output connected to said second input of said track change-over circuit and to said third input of said zero-finding circuit and a group of outputs connected to said output of said control unit, said variable delay unit control circuit comprising:

first, second and third reversible shift registers having a complementing input, a reset input, a forward shift command input, a backward shift command input and outputs equal in number to said register bits, said complementing input of said first reversible shift register being connected to said first clock pulse input of said varible delay unit control circuit, said reset input of each of said reversible shift registers being conneced to said first input of said variable delay unit control circuit, said forward shift command inputs of said first and second reversible shift registers being connected to said first input of said second pair of reversal signal inputs of said variable delay unit control circuit, said backward shift command inputs of said first and second reversible shift registers being connected to said second input of said second pair of the reversal signal inputs of said varible delay unit control circuit, said complementing input of said second reversible shift register being operatively associated with outputs of first and last bits of said first reversible shift register, said complementing input of said third reversible shift register being connected to said second clock pulse input of said variable delay unit control circuit, said forward shift command input of said third reversible shift register being connected to said second input of said first pair of reversal signal inputs of said variable delay unit control circuit, said backward shift command input of said third reversible shift register being connected to said first input of said first pair of reversal signal inputs of said variable delay unit control circuit, each of said outputs of each of said reversible shift registers being operatively associated with the respective output of said group of outputs of said varible delay unit control circuit, said first output of said varible delay unit control circuit being operatively associated with outputs of first and last bits of said third reversible shift register.

9. A ranging system according to claim 8, wherein said transmitter of said ground station and said transmitter of said airborne equipment each comprises a modulator incorporating a transistor with a negative feedback loop, a field-effect transistor conneced into said negative feedback loop of said transistor, and a capcitor connected into said negative feedback loop of said transistor and connected in series with said field-effect transistor.

10. A ranging system according to claim 9, wherein said differential averaging unit comprises:

two input integrating circuits, for averaging pulses from said outputs of said coincidence circuits, having an input connected to a respective input of said differential averaging unit and an output;

an operational amplifier having inputs connected to said output of a respective input integrating circuit and an output connected to said error signal output of said processing unit; and wherein each of said input integrating circuits incorporates a series connection of a first resistor, a diode and a capacitor, and a second resistor placed between one of said inputs of said operational amplifier and a junction point of said diode and said capacitor.

* * * * *